(12) United States Patent
Van Doren

(10) Patent No.: US 6,185,654 B1
(45) Date of Patent: Feb. 6, 2001

(54) PHANTOM RESOURCE MEMORY ADDRESS MAPPING SYSTEM

(75) Inventor: Stephen Richard Van Doren, Northborough, MA (US)

(73) Assignee: Compaq Computer Corporation, Houston, TX (US)

( * ) Notice: Under 35 U.S.C. 154(b), the term of this patent shall be extended for 0 days.

(21) Appl. No.: 09/118,985

(22) Filed: Jul. 17, 1998

(51) Int. Cl.[7] ....................................................... G06F 12/10
(52) U.S. Cl. .............................. 711/5; 711/147; 711/202; 711/158; 711/157
(58) Field of Search ............................... 711/5, 147, 202, 711/158, 157

(56) References Cited

U.S. PATENT DOCUMENTS

| | | | |
|---|---|---|---|
| 5,893,932 | * | 4/1999 | Dey et al. ............................. 711/211 |
| 5,895,480 | * | 4/1999 | Yung et al. .............................. 711/5 |
| 5,895,481 | * | 4/1999 | Yap .......................................... 711/5 |

* cited by examiner

Primary Examiner—Reginald G. Bragdon
(74) Attorney, Agent, or Firm—Cesari and McKenna, LLP

(57) ABSTRACT

A phantom-resource memory address mapping system reduces access latency in a memory configured as a stacked-hybrid or filly-interleaved hierarchy of memory resources. The address mapping system comprises memory access circuitry having a topology that combines an interleaved-based translation function in parallel with a stacked-based translation operation. The translation functions operate in conjunction with a phantom-resource memory mapping technique. The memory address mapping system reduces the latency incurred when accessing data in response to a memory reference address, while allowing flexibility with respect to the sizes and amounts of memory resources (e.g., modules, arrays and banks) that may be populated in a data processing system.

24 Claims, 18 Drawing Sheets

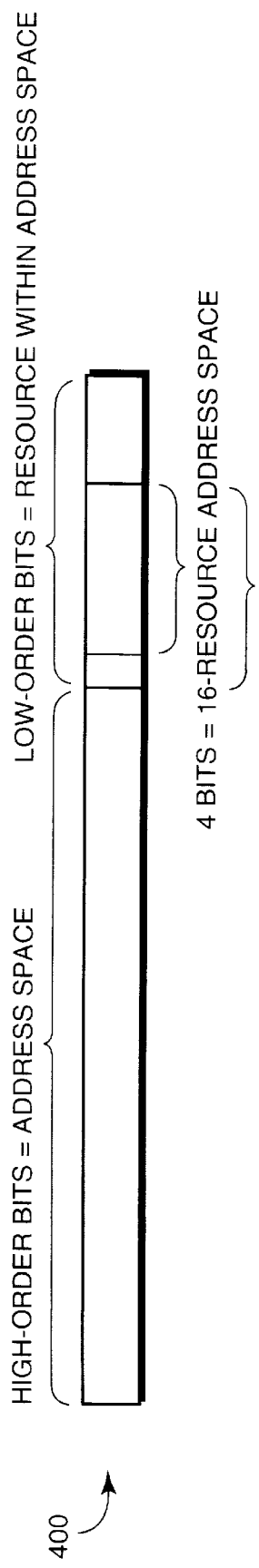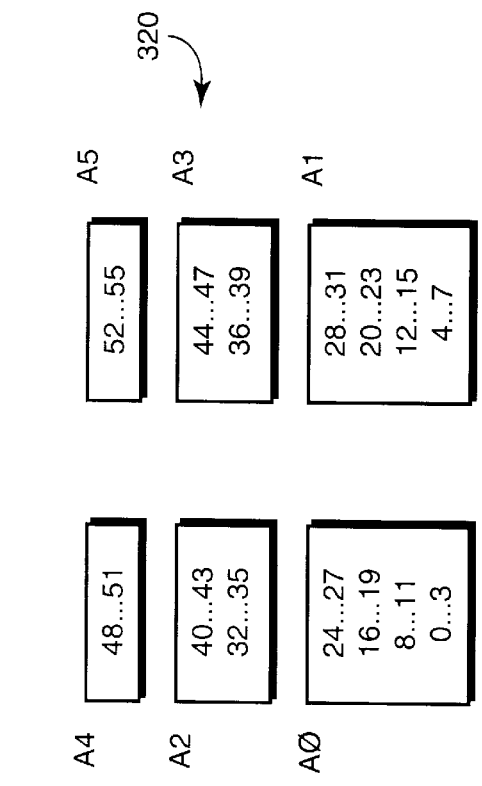
FIG. 4
PRIOR ART
FIG. 3
PRIOR ART

| ADDRESS<10:6> | MODULE | ARRAY | RANK | BANK |
|---|---|---|---|---|
| 00000 | 0 | 0 | 0 | 0 |
| 00001 | 1 | 1 | 1 | 1 |
| 00010 | 2 | 2 | 2 | 2 |
| 00011 | 3 | 3 | 3 | 3 |
| 00100 | 0 | 4 | 4 | 4 |
| 00101 | 1 | 5 | 5 | 5 |
| 00110 | 2 | 6 | 6 | 6 |
| 00111 | 3 | 7 | 7 | 7 |
| 01000 | 0 | 0 | 8 | 8 |
| 01001 | 1 | 1 | 9 | 9 |
| 01010 | 2 | 2 | 10 | 10 |
| 01011 | 3 | 3 | 11 | 11 |
| 01100 | 0 | 4 | 12 | 12 |
| 01101 | 1 | 5 | 13 | 13 |
| 01110 | 2 | 6 | 14 | 14 |
| 01111 | 3 | 7 | 15 | 15 |
| 10000 | 0 | 0 | 0 | 16 |
| 10001 | 1 | 1 | 1 | 17 |
| 10010 | 2 | 2 | 2 | 18 |
| 10011 | 3 | 3 | 3 | 19 |
| 10100 | 0 | 4 | 4 | 20 |
| 10101 | 1 | 5 | 5 | 21 |
| 10110 | 2 | 6 | 6 | 22 |
| 10111 | 3 | 7 | 7 | 23 |
| 11000 | 0 | 0 | 8 | 24 |
| 11001 | 1 | 1 | 9 | 25 |
| 11010 | 2 | 2 | 10 | 26 |
| 11011 | 3 | 3 | 11 | 27 |
| 11100 | 0 | 4 | 12 | 28 |
| 11101 | 1 | 5 | 13 | 29 |
| 11110 | 2 | 6 | 14 | 30 |
| 11111 | 3 | 7 | 15 | 31 |

*FIG. 9*

TABLE 2

| MEMORY INTERLEAVE FACTOR | MISK-BUSY-MASK 1312 |
|---|---|
| 32 | 000 |
| 16 | 100 |
| 8 | 110 |
| 4 | 111 |

TABLE 3

| MEMORY INTERLEAVE FACTOR | MODULE INTERLEAVE FACTOR | PORT BUSY MASK |
|---|---|---|
| 32 | 4 | 00 |
| 16 | 4 | 00 |
|  | 2 | 10 |
| 8 | 2 | 10 |
|  | 1 | 11 |
| 4 | 1 | 11 |

PHANTOM RESOURCE MEMORY ADDRESS MAPPING SYSTEM

FIELD OF THE INVENTION

The invention relates to memory systems and, more specifically, to a memory resource address mapping technique for a computer system.

BACKGROUND OF THE INVENTION

Computer memory systems typically comprise a plurality of elemental memory storage components, such as discrete Random Access Memory (RAM) chips, aggregations of RAM chips on Single In-line Memory Modules (SIMMs) or Dual In-line Memory Modules (DIMMs). These elemental memory components are available in a variety of storage capacities and organizations. A memory system of a computer may comprise a fixed or varied number of these components of a single storage capacity or of multiple storage capacities. In addition, the components may be aggregated into larger entities of a memory system. A memory array, for example, may comprise multiple DIMMs of a common storage capacity.

A computer having a memory system described above typically employs an address mapping function to direct data requests issued by a processor to the specific memory component or aggregation containing the requested data. The address mapping function generally "maps" the address location of a data request to a memory storage component which is then activated to satisfy the request. Address mapping functions may vary according to the organizations of the memory storage components with the resulting complexity of a function impacting both the performance and flexibility of the computer. For example, if the addressing mapping function is complex in nature, it can delay activation of a memory storage component which increases memory read latency and, in turn, diminishes system performance. A simple address mapping scheme, on the other hand, may exhibit low memory read latency, but may also limit the number of configurations into which the memory storage components may be organized. This latter scheme may limit a system's ability to configure around a failing memory component, as well as limit the system's upgradability.

Interleaving is a memory organization technique wherein memory address locations are distributed consecutively across multiple memory storage components to create a common memory address space. A fully interleaved memory system distributes addresses consecutively across all memory storage components to create a single memory address space for the entire system. FIG. 1 is a schematic block diagram of a conventional fully interleaved memory system 100 comprising a plurality of memory resources which, in this case, are memory arrays. The number sequences shown among the arrays indicate the distribution of consecutive memory addresses. Note that a total of eight arrays are shown with every eighth address mapped to the same array.

The address mapping function for the fully interleaved memory system of FIG. 1 is quite simple: the three low-order bits of a memory address are a binary encoding of an array number that maps to the address. This type of mapping function is fast and efficient, providing little memory read latency penalty. Such a mapping scheme, however, restricts the configurations into which the memory storage components may be organized. Specifically, a fully interleaved memory organization requires that (i) all memory storage components (i.e. arrays) be of a common storage capacity and (ii) the number of memory storage components (i.e. arrays) be a power-of-2.

Stacking is another memory organization technique wherein the system memory address space is divided into a plurality of memory address sub-spaces. Consecutive memory address locations are initially distributed within a first memory address sub-space until all storage capacity within that sub-space is exhausted. Thereafter, subsequent memory address locations are distributed within a second memory address sub-space. This process repeats until all storage locations within all sub-spaces have been assigned addresses.

FIG. 2 is a schematic block diagram of a conventional memory system 200 comprising a plurality of stacked memory resources or arrays. In contrast to the fully interleaved system, the stacked memory system 200 contains a number of memory arrays that is not a power-of-2 and the arrays are apportioned into a number of address sub-spaces that is not a power-of-2. Moreover, the arrays are of varied sizes, with array 0 having a capacity of sixteen storage locations, arrays 1 and 2 having capacities of four storage locations, array 3 having a capacity of four storage locations, array 4 having a capacity of two storage locations and array 5 having a capacity of one storage location. It should be noted that in a stacked configuration addresses may be distributed within an address space in an interleaved manner and address sub-spaces, such as address space 1 in FIG. 2, may be formed by combining and interleaving similarly-sized memory storage components.

The address mapping function for a stacked memory system is generally more complex than the mapping function of a fully interleaved memory. In the former case, the mapping function first determines the address sub-space to which a referenced address maps. This determination is generally made based upon the size of the sub-space and the starting address of the sub-space. Next, the address mapping function determines the interleave mapping within an address sub-space in substantially the same manner as a fully interleaved address mapping function; namely, by means of a binary decode of the low order address bits. The additional determination imposed on a stacked memory address mapping function makes such a scheme expensive in terms of memory read latency and system performance. Yet, the flexibility of the stacked mapping scheme allows a wide variety of combinations of memory storage components, regardless of the size or number of those components.

The present invention is directed to a memory address mapping system that supports a third memory organization technique which exhibits desirable properties of both the fully interleaved and stacked memory configurations. This third technique, referred to as a stacked-hybrid configuration technique, assembles memory storage components into one stacked memory address space which is then fully interleaved. Since the entire memory is interleaved, a simple, performance efficient, fully interleaved address mapping function can be employed. While the fully interleaved aspect of the stacked-hybrid configuration mandates that all memory storage components in a stack have compatible interleave capability, thereby restricting the flexibility of the system somewhat, the configuration still allows different memory storage components in a stack to have different capacities.

FIG. 3 is a block diagram of a stacked-hybrid memory system 300 that includes six memory arrays, arranged in two three-deep stacks 310, 320, which is eight-way fully interleaved. Although the arrays of stack 310 differ in size, they are similarly sized with respect to corresponding arrays of stack 320; that is, Arrays A0 and A1 are the same size, Arrays A2 and A3 are the same size, and Arrays A4 and A5 are the same size. In a stacked-hybrid configuration, interleaving is permissible between the similarly-sized pair of arrays from each stack. Referring to A0 and A1, addresses 0–3 are located in A0, addresses 4–7 are in A1, addresses 8–11 are in A0, addresses 12–15 are in A1, and so on. Essentially, the stacked-hybrid memory system 300 presents a single address space interleaved two ways across the pairs of stacks.

As an illustration of a mapping function, refer to the schematic diagram of a conventional memory reference (physical) address 400 shown in FIG. 4. Five bits are needed to encode an array number that maps a 32-resource (array) address space. Similarly, four bits are needed to encode an array number that maps a 16-resource address space. The low-order bits of a memory reference address generally specify the resource within an address space, whereas the high-order bits of the reference specify the address space. In a fully-interleaved memory system, there is only one address space so the high-order address bits do not have to be examined; only the low-order bits need decoding to determine the location of data within the address space.

In contrast, a stack-hybrid configuration may have many different address spaces, each with its own number of interleaved resources. To support this type of system, mechanisms are provided to indicate (i) the size of the address space referenced and (ii) the number of bits needed to determine the interleaving arrangement within the address space; in both cases, the mechanism is typically a mask. The number of bits needed to define an address space may vary depending upon the size of the address space. Combinatorial logic used for address decoding generally requires application of a mask to a memory address issued by a processor to indicate the number of bits needed to define such an address space. Similarly, the logic utilizes masks to assess the number of bits of a particular address space that are needed to resolve the number of interleaved resources. Address mapping may further require comparison operations between the issued memory reference address and an address stored in a mapping register of the system, along with operations to combine an address-based check with an interleaved-based check to determine the resource storing the requested data.

The present invention is directed to a memory address mapping system that provides flexibility in the use of different sized memory resources while providing the latency advantages of a fully-interleaved memory system.

SUMMARY OF THE INVENTION

The invention relates to a phantom-resource memory address mapping system that reduces access latency in a memory configured as a stacked-hybrid or fully-interleaved hierarchy of memory resources. The address mapping system comprises memory access circuitry having a topology that combines an interleaved-based translation function in parallel with a stacked-based translation operation. Notably, these translation functions operate in conjunction with a novel phantom-resource memory mapping technique. The inventive memory address mapping system reduces the latency incurred when accessing data in response to a memory reference address, while allowing flexibility with respect to the sizes and amounts of memory resources (e.g., modules, arrays and banks) that may be populated in a data processing system.

In one aspect of the invention, the topology of the address translation circuit comprises a primary path including a first interleave translation stage coupled to a plurality of second interleave translation stages via an arbitration stage. The primary path further includes a processor, a plurality of memory resources and a data switch. The first interleave translation stage translates each memory reference address issued by the processor to an arbitration request directed to at least one memory resource and, after selection of an arbitrated request, the second interleave translation stage performs array mapping operations to initiate preliminary access to the translated memory resource(s). A plurality of stacked translation circuits and a resource mapping logic circuit operate in parallel with the preliminary access to isolate the actual memory resource referenced by the memory address. Data is then retrieved from the isolated resource.

According to another aspect of the invention, the phantom-resource memory mapping technique essentially maps each issued memory reference address to a fixed-resource, fully-interleaved memory arbitration request. For example, in the illustrative embodiment, the technique maps a memory reference address to an arbitration request directed to a fully-configured, 32-unit (i.e., bank) interleaved memory configuration. By mapping addresses to a fixed-resource configuration, the novel technique eliminates the need for an interleave mask at the first interleave translation stage in the event the memory is not fully configured. For this latter case, more than one resource may map to a translated interleave address; those logical memory resources that are not the actual addressed resource (and which do not have corresponding physical memory resources) may comprise phantom memory resources. Resource mapping and busy logic is employed to set these phantom hierarchical resources "busy" so as to limit traffic through them during a memory access.

Advantageously, the invention simplifies interleave translation in the first stage of the primary access path by eliminating the interleave translation mask, and its associated operations, to thereby improve memory access latency while providing full memory bandwidth for a fully-interleaved system. For a stacked-hybrid configuration, the invention further reduces latency of address translations by displacing complicated stacked translation circuitry from the primary path to the parallel path, while also providing users with the flexibility to expand memory with various amounts and sizes of physical memory resources.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 3 is a schematic block diagram of a stacked-hybrid memory system;

FIG. 4 is a schematic diagram of a conventional memory address used to reference resources of the memory systems of FIGS. 1–3;

FIG. 9 illustrates a memory mapping address decode example of the interleave translation stage of the phantom resource mapping technique of FIGS. 8A–8B;

DETAILED DESCRIPTION OF AN ILLUSTRATIVE EMBODIMENT

Figure 1:
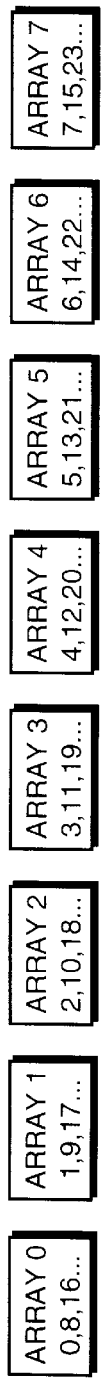
FIG. 1 is a schematic block diagram of a conventional memory system comprising a plurality of fully-interleaved memory resources.
Figure 2:
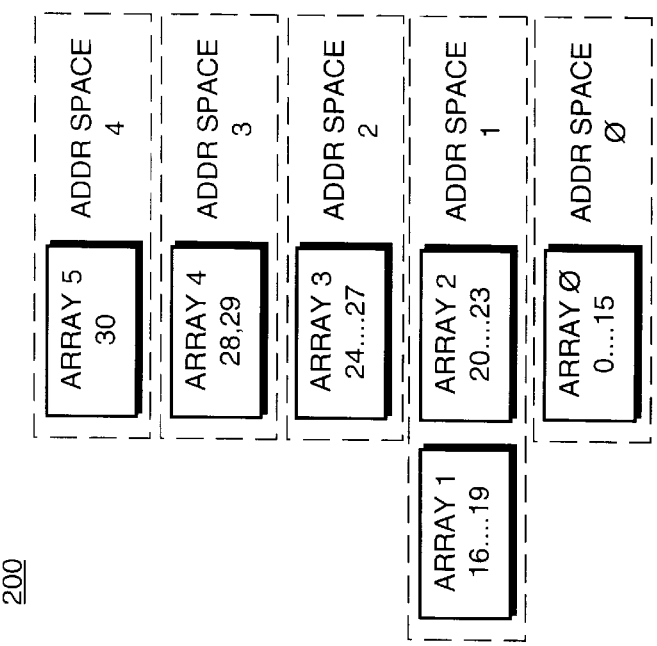
FIG. 2 is a schematic block diagram of a conventional memory system comprising a plurality of stacked memory resources.
Figure 5:
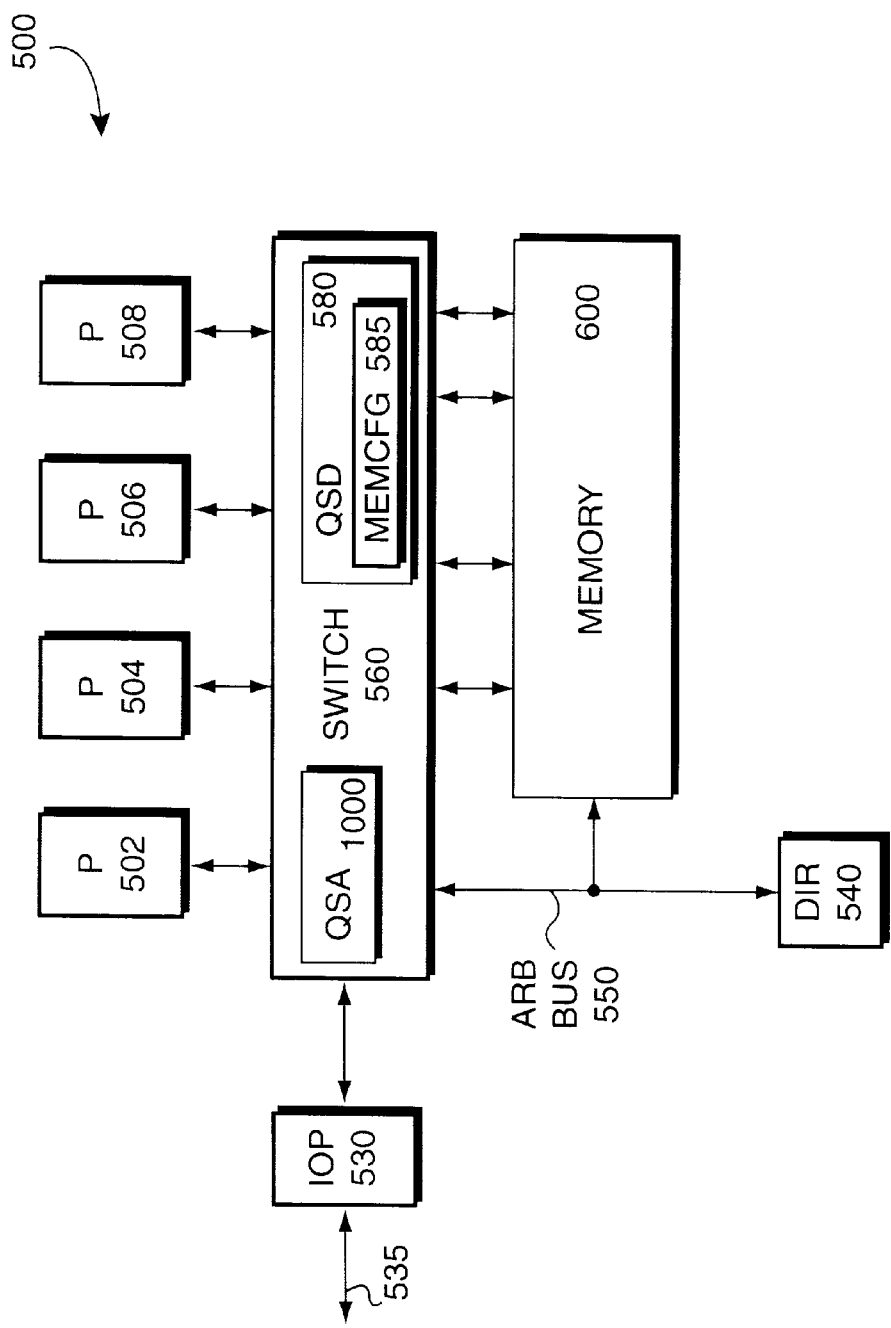
FIG. 5 is a schematic diagram of a data processing system including processor, switch, memory and directory components that may be advantageously used with the present invention.

FIG. 5 is a schematic block diagram of a data processing system 500 comprising a plurality of processors (P) 502–508 coupled to an input/output processor (IOP) 530 and a memory 600 by a switch 560. An Arb bus 550 further interconnects the switch and memory to a directory (DIR) 540. In the illustrative embodiment described herein, the data processing system platform is a symmetric multi-processing (SMP) node; however, in an alternate embodiment, the data processing system may be an SMP system that includes a number of SMP nodes interconnected by a hierarchical switch. In this latter embodiment, each SMP node functions as a building block in the SMP system. The inventive address mapping technique described herein adapts to the particular memory configuration of an SMP node; accordingly, for the SMP system embodiment, each SMP node may have its own memory mapping configuration. Examples of the SMP node and SMP system that may be advantageously used with the present invention are disclosed in copending and commonly-assigned U.S. patent application Ser. No. 08/957,097 which application is hereby incorporated by reference as though fully set forth herein.

The switch 560 comprises an intelligent address controller (QSA) 1000 and a simple data path controller (QSD) 580 for interconnecting the components of the SMP node 500, whereas the directory 540 comprises a structure configured to maintain coherency of data among the node components. The QSD 580 includes a register (MemCfg) 585 to control interfaces to memory modules in an outbound direction. The IOP 130 controls the transfer of data between external devices (not shown) and the system via an I/O bus 535. Data is transferred between the components of the SMP node in the form of packets. As used herein, the term "system" refers to all components of the SMP node excluding the processors and IOP. In an embodiment of the invention, the I/O bus may operate according to the conventional Peripheral Computer Interconnect (PCI) protocol.

Each processor P is a modern processor comprising a central processing unit (CPU) that preferably incorporates a traditional reduced instruction set computer load/store architecture. In the illustrative embodiment, the CPUs are Alpha® 21264 processor chips manufactured by Digital Equipment Corporations®, although other types of processor chips may be advantageously used. The load/store instructions executed by the processors are issued to the system as memory reference, e.g., read and write, operations. Each operation may comprise a series of commands (or requests) that are exchanged between the processors and the system.

A maintenance processor (not shown) resides on a backplane of the SMP node and polls the components at power up to determine the configuration of the node. The results of this investigation are registered with software executing on the CPUs. Using this information, the CPU software initializes various registers (described herein) in the QSA, the QSD, the directory and the memory to properly map the memory.

Figure 6:
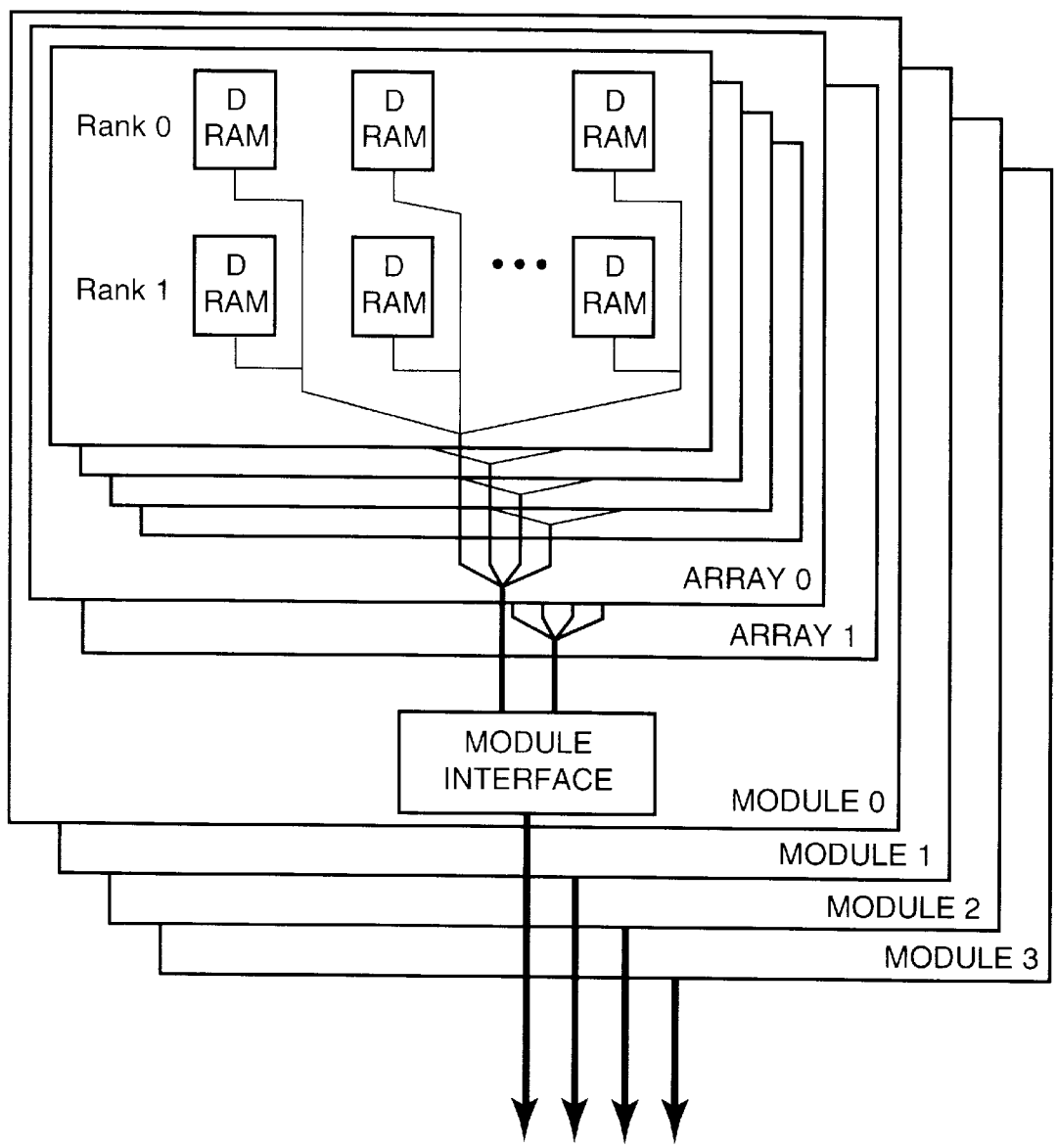
FIG. 6 is a schematic block diagram illustrating the resources of memory for use with the present invention.

The memory 600 comprises storage locations that are shared by the processors for storing and providing data in accordance with the inventive address mapping technique. The storage locations may include dynamic random access memory (DRAM) devices configured as a plurality of hierarchical memory resources, such as modules, arrays and banks, that share common address and data paths. FIG. 6 is a schematic block diagram illustrating the resources of memory 600 for use with the present invention.

In the illustrative embodiment, the memory 600 comprises four (4) memory modules, each of which comprises up to two (2) memory arrays for a total of eight (8) arrays.

Moreover, each array comprises four (4) memory banks for a maximum of thirty-two (32) banks per SMP node. In an alternate embodiment, the resources may further include ranks, which are logical aggregations of pairs of memory banks. It should be noted, however, that the memory system of the present invention may be implemented as a "flat" memory with only banks as resources. Despite the particular configuration of the memory, the resources are configured to provide either a fully-interleaved or stacked-hybrid memory system for use with the present invention.

Memory Access Path

Figure 7:
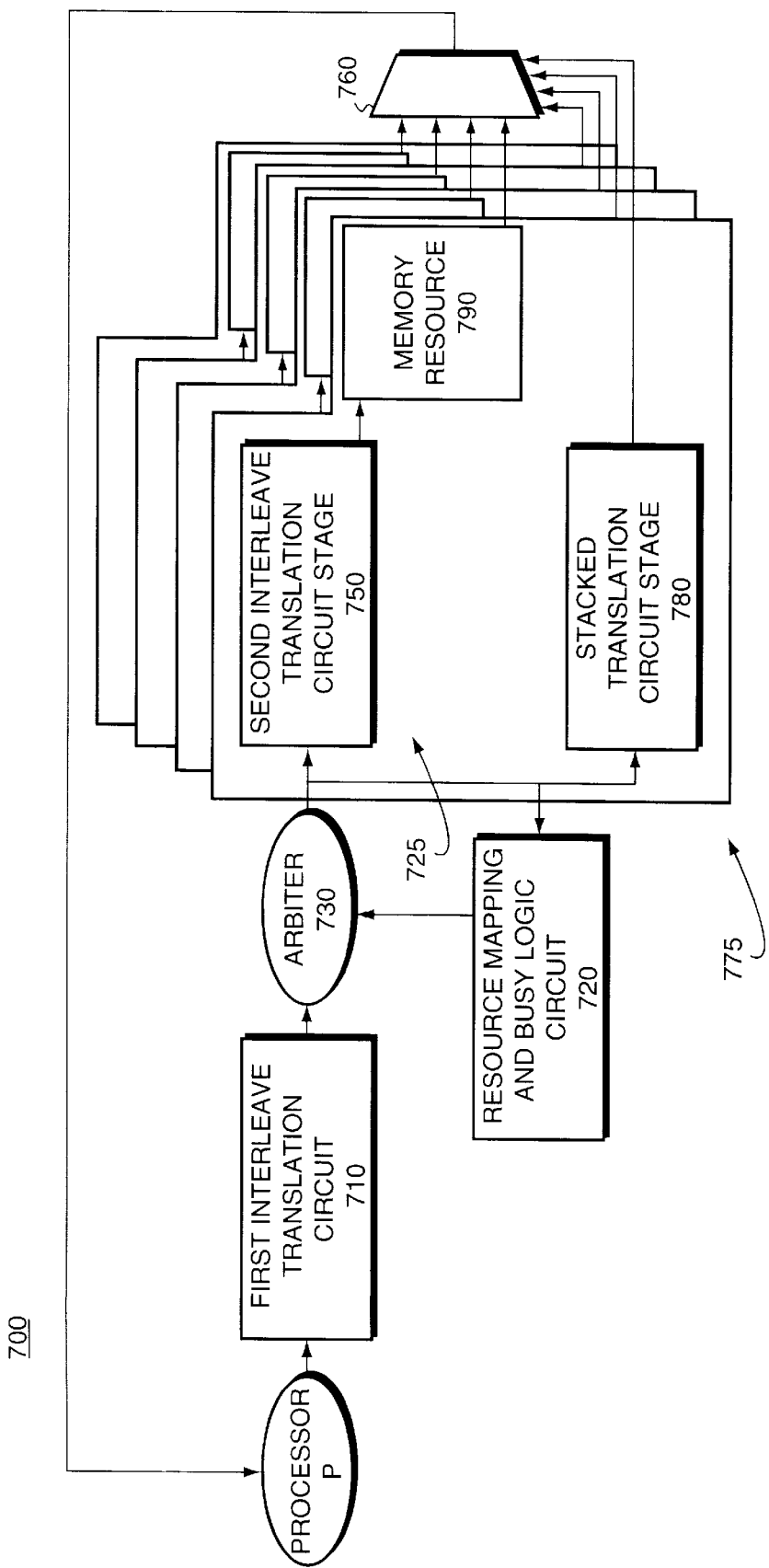
FIG. 7 is a schematic block diagram of memory access circuitry, portions of which are distributed among the data processing system components, including a QSA component.

FIG. 7 is a schematic block diagram of memory access circuitry 700, portions of which are distributed among the QSA 1000, memory 600 and directory 540 components of the SMP node 500. Specifically, a processor P, a first interleave translation circuit 710, an arbiter 730, a plurality of a second interleave translation circuits 750, a plurality of memory resources 790 and a data switch (e.g., a multiplexer) 760 comprise a primary memory access path 725. A resource mapping and busy logic circuit 720 along with a plurality of stacked translation circuits 780 comprise secondary address translation paths 775 that operate in parallel with the second interleave translation circuits 750 and the memory resources 790.

The first interleave translation circuit 710 comprises conventional interleave translation circuitry which maps each address to a fixed, fully interleaved thirty-two (32) bank memory system. The second interleave translation circuit 750 also comprises basic interleave translation circuitry, but further includes simple masking logic to incorporate support for 4, 8, 16 and 32-way interleaved memory systems. The stacked translation stage 780 preferably comprises conventional masking and comparison logic circuitry for determining, inter alia, the address space (i.e. the particular memory resource) of a particular memory reference request. The resource mapping and busy logic circuit 720 comprises a unique address translation circuit that, by means of an address masking operation, allows multiple memory resources to map to a common address space.

In accordance with one aspect of the present invention, a phantom resource mapping technique is provided that allows a processor, such as processor P, to request access to memory components, such as resources 790, in a manner that assumes a fully configured memory resource arrangement for all varied memory configurations. In the illustrative embodiment, the technique functions by generating requests as though there are always 32 interleave units in memory, where an interleave unit comprises one or more stacked memory banks. The memory interleave units for which requests are generated are referred to as logical interleave units, whereas the actual groups of memory components themselves are referred to as physical interleave units.

For a memory system that is less than 32-way interleaved, all logical interleave units that do not have corresponding physical memory banks are referred to as phantom memory banks. When phantom memory banks are employed, each phantom logical bank is mapped such that it shares a single physical memory bank with one or more other logical memory banks, only one of which directly corresponds to the physical memory bank. All logical memory banks that map to a common physical memory bank function in accordance with their common physical bank. For example, when a physical memory bank transitions into a busy state, all corresponding logical memory banks transition into the busy state as well.

The phantom bank mapping technique obviates the need for an interleave mask step in the first interleave translation stage 710. By eliminating this masking step, the memory access path latency is improved. As described herein, the novel technique replaces the masking step in the first interleave stage 710 with a masking step in the resource mapping and busy logic 720 which operates outside of the primary memory access path 725. By displacing the masking step, the logic 720 may manipulate the state of one or more logical memory banks in response to a single event. This, in turn, allows multiple phantom banks to transition into the busy state in response to any single reference to a corresponding physical bank.

In accordance with another aspect of the present invention, a stacked bank mapping technique is employed that allows stacking of multiple memory components 790 within the interleave units in such a way that the complex stacked address mapping function is performed in parallel with the operation of the primary memory access path 725. The illustrative embodiment described herein supports memory resource stacking in the form of stacked-hybrid configurations only. That is, the illustrative memory system may be configured as 4, 8, 16 or 32 physical interleave units, each of which is comprised of 1, 2, 4 or 8 stacked memory banks, such that the total number of banks does not exceed 32.

The stacked bank mapping function operates such that when a physical interleave unit is addressed by a memory read reference, each memory bank within the addressed interleave unit executes a DRAM read cycle. While the DRAM components execute their read cycles, the stacked bank mapping function performs an address range check and determines which of the cycling memory banks contain the requested data. At the end of the DRAM cycle, the results of the address range check are used to logically multiplex the data from the memory bank containing the requested data through data switch 760 and onto the requesting processor's data path.

In accordance with yet another aspect of the present invention, a physical interleave mapping scheme is employed that allows memory component hardware installed in a fixed memory hardware infrastructure to be (i) installed in varying positions within the infrastructure, but mapped to a common physical interleave mapping arrangement, or (ii) installed in fixed positions within the infrastructure, but mapped to varying physical interleave mapping arrangements. The memory hardware infrastructure of the illustrative embodiment preferably includes a motherboard which, inter alia, comprises four (4) memory module slot connectors. One memory module may be plugged into each of the four memory module slot connectors. Each memory module comprises, inter alia, two (2) sets of DRAM DIMM connectors. Four (4) DRAM DIMMs may be inserted into each set of connectors to form a memory array. Each of the DRAM DIMMs used in the illustrative embodiment comprise four (4) internal memory banks which are organized into two (2) memory ranks of two (2) banks each. This yields a memory system with a maximum capacity of thirty-two (32) banks, sixteen (16) ranks, eight (8) arrays and four (4) modules, wherein arrays of four (4) DIMMs are the memory component hardware elements used to populate the system.

Within such a memory infrastructure, array components may be inserted as sets into the DRAM DIMM connectors in a variety of configurations while being mapped to a common interleave mapping. A group of four (4) identical DIMM array sets, for example, can be mapped to a common sixteen (16) way interleaved configuration when populated in the following sample configurations: (i) one array is populated in one of the DIMM connector sets per each of four modules #0–3; (ii) the arrays are populated in both arrays on module #0 and both arrays on module #2; and (iii) the arrays are populated in both arrays on module #0 and both arrays on module #1.

Similarly, a fixed set of DIMMs may map to a variety of interleave arrangements. If, for example, four (4) identical DIMM arrays are populated in both arrays of modules #0 and #1, these arrays could be configured as: (i) a 16-way interleaved system; (ii) an 8-way interleaved system, wherein each interleave unit comprises two (2) stacked arrays, or (iii) a 4-way interleaved system wherein each interleave unit comprises four (4) stacked arrays.

As noted, the multiprocessor system 500 of the illustrative embodiment includes directory 540 for maintaining data (cache) coherency in the system. The directory, like the memory, implements DIMM-based DRAM storage and is organized into thirty-two (32) banks. Unlike the memory, however, the directory is further organized according to its eight (8) DRAM DIMMs, each of which corresponds to one memory array, and is logically divided into two (2) ranks and four (4) banks. The directory hardware infrastructure preferably comprises a single module which supports all eight (8) directory DIMMs as arrays on a single module. While operation of the directory provides less bandwidth to the system on a per bank basis, the directory has more available bandwidth with regard to the logical rank, array and module resources. As such all system arbitration is performed based on the availability of memory resources, wherein the availability of a memory bank is artificially limited by the bandwidth of a directory bank. The directory 540 includes the same phantom bank and varied configuration support as the memory modules through a similar interleave translation circuit.

Phantom Resource Mapping Technique

Figure 8A:
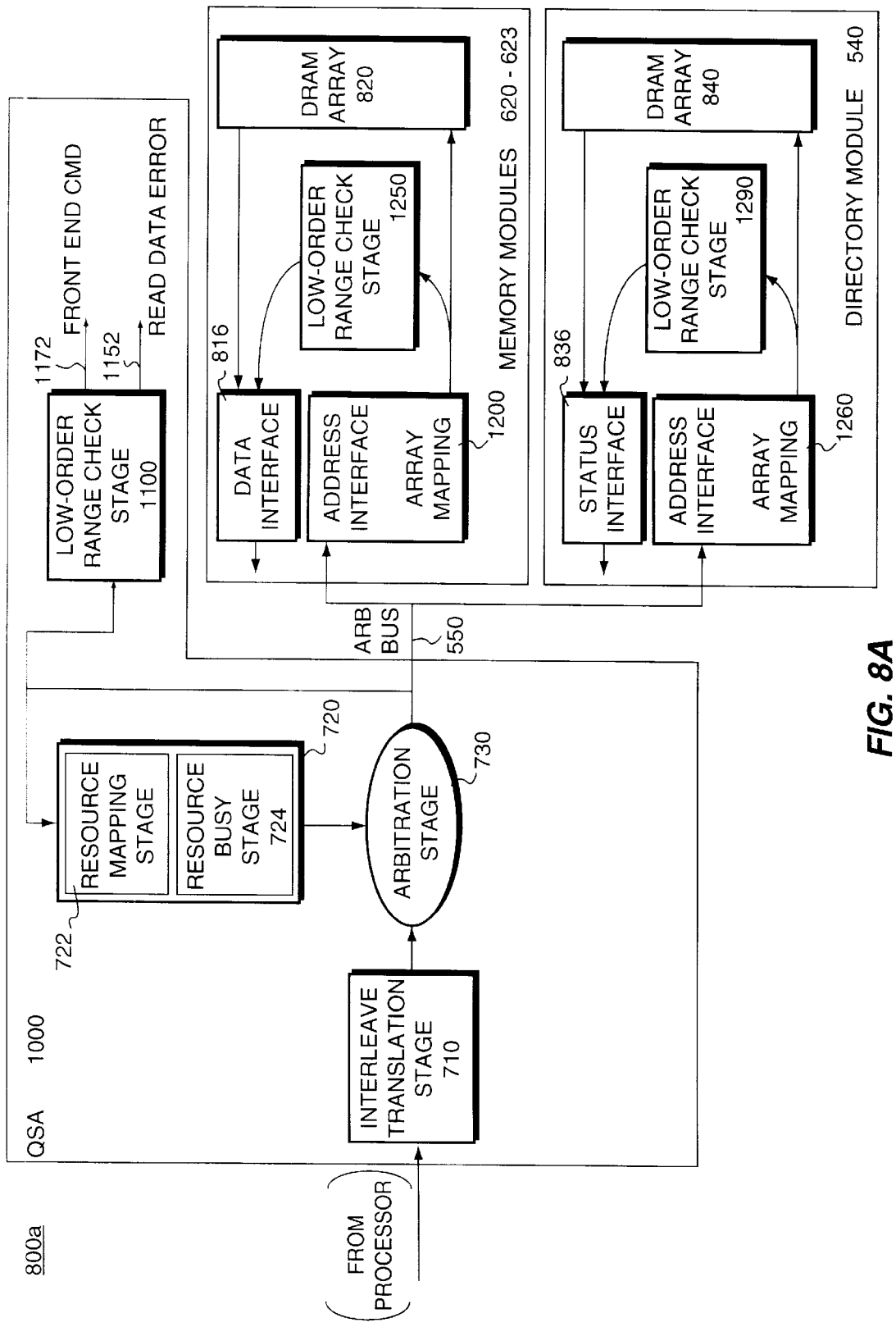
FIG. 8A is a functional block diagram illustrating various stages of a phantom resource mapping technique, including an interleave translation stage, a resource mapping and busy logic stage, and array mapping and range check stages according to the invention.

FIG. 8A is a functional block diagram illustrating the various stages of the phantom resource mapping technique 800a according to the invention. The stages of the technique are operatively associated with the memory access circuitry 700, portions of which are distributed among the QSA 1000, memory 600 and directory 540 components of the SMP node 500. In particular, each of these components include functions for performing conventional address translations and range checks to ensure that a memory reference request issued by a processor is directed to the appropriate memory resource in an efficient manner.

Figure 8B:
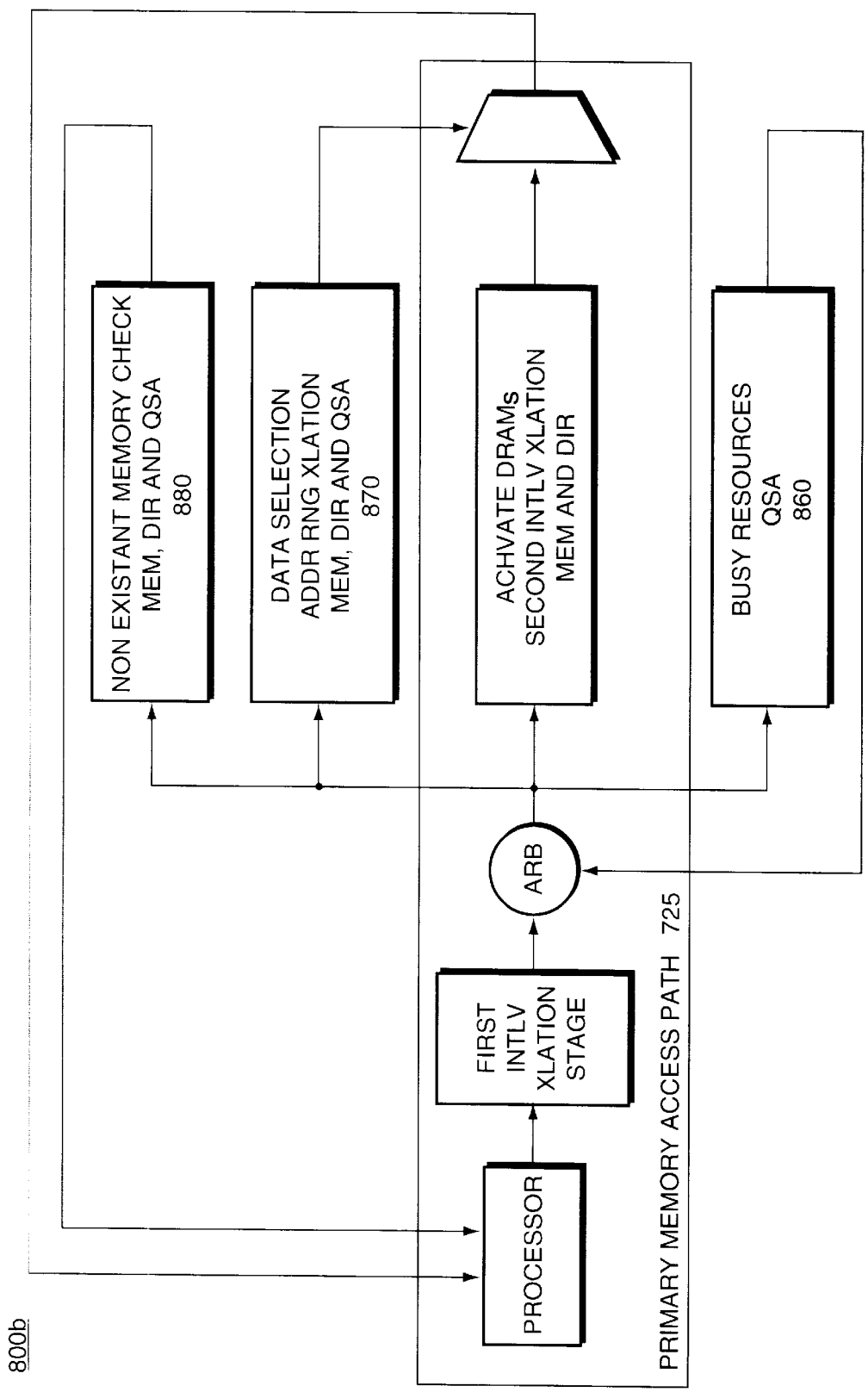
FIG. 8B is a process flow diagram of the phantom resource mapping technique comprising a primary memory address path and a plurality of parallel functional paths.

FIG. 8B is a process flow diagram of the phantom resource mapping technique 800b comprising primary memory address path 725 and three (3) parallel functional paths. The parallel functional paths include a busy resource function 860, a data selection function 870 and a non-existant memory check function 880.

1. Primary Memory Access Path

Any processor, including the IOP 530, may issue a memory reference request to the memory. The request preferably includes a 43-bit physical address (see 400 at FIG. 4) that has been previously translated from a virtual address by the processor. The physical address is thereafter translated by the first interleave translation logic stage 710 to determine which resource(s) to access and the resulting resource request(s) are provided to the arbiter 730 along with state information from the resource mapping and busy logic 720. The state information pertains to the availability of the requested resource(s). The request(s) then arbitrate in accordance with a fair arbitration policy described herein, and a request is selected by the arbiter and granted access to the memory.

A memory reference request issued by processor P is translated by the first interleave translation stage 710 of the QSA to initiate arbitration as though the system were a fixed 32-way interleaved system. That is, the interleave translation stage comprises a decode operation directed at the low order bits (see FIG. 4 ) of a physical address contained in the memory reference request. FIG. 9 illustrates a memory mapping address decode example of the interleave translation stage 710 for the fixed 32-bank interleaved configuration comprising module, array, rank and bank resources. Functionally, the interleave translation stage 710 performs a 5-bit decode operation directed to the thirty-two (32) bank resources, a 4-bit decode directed at the sixteen (16) rank resources, a 3-bit decode directed at the eight (8) array resources and a 2-bit decode directed at the four (4) module resources.

Figure 10:
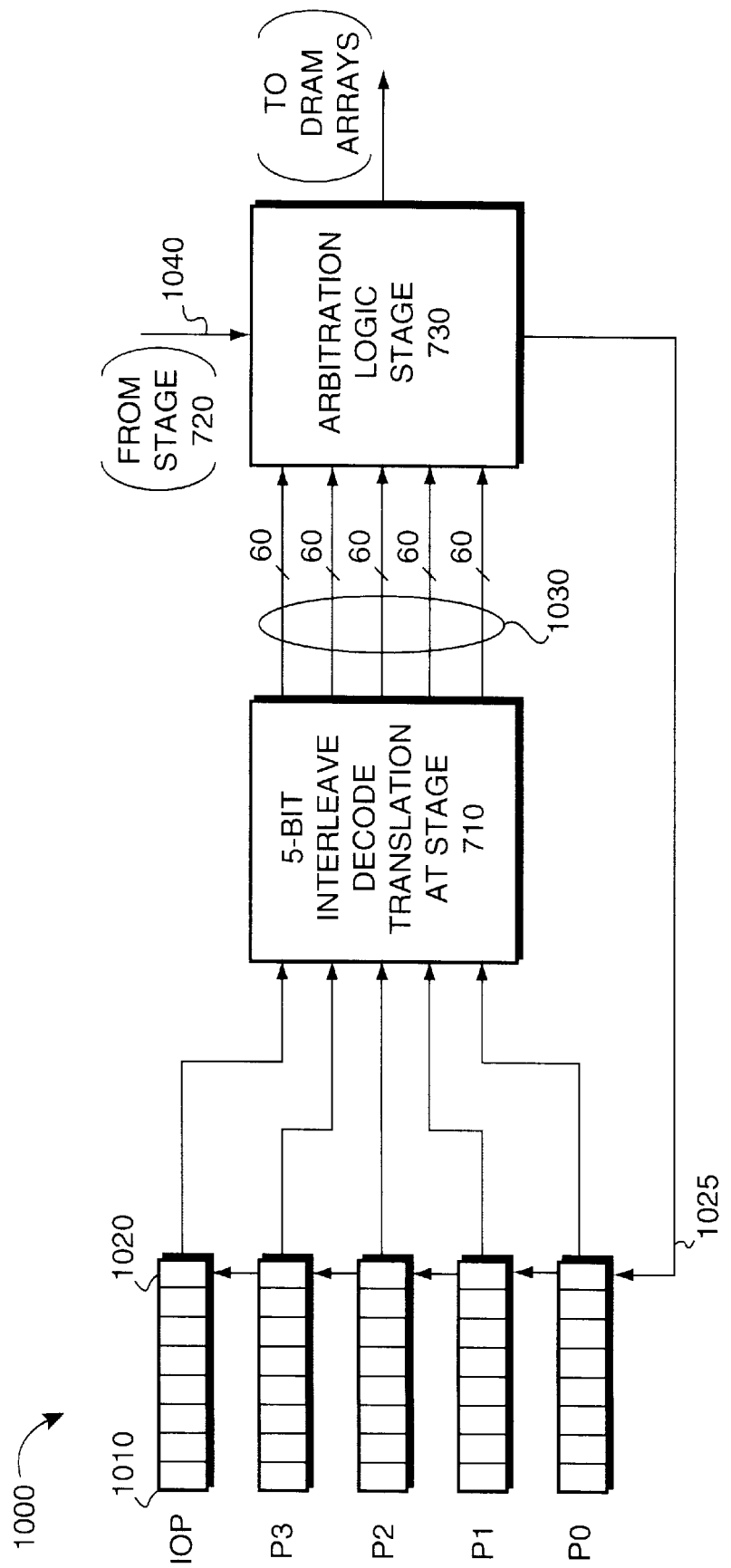
FIG. 10 is a highly schematized block diagram of portions of the QSA that pertain to the phantom resource mapping technique of FIGS. 8A–8B.
Figure 11:
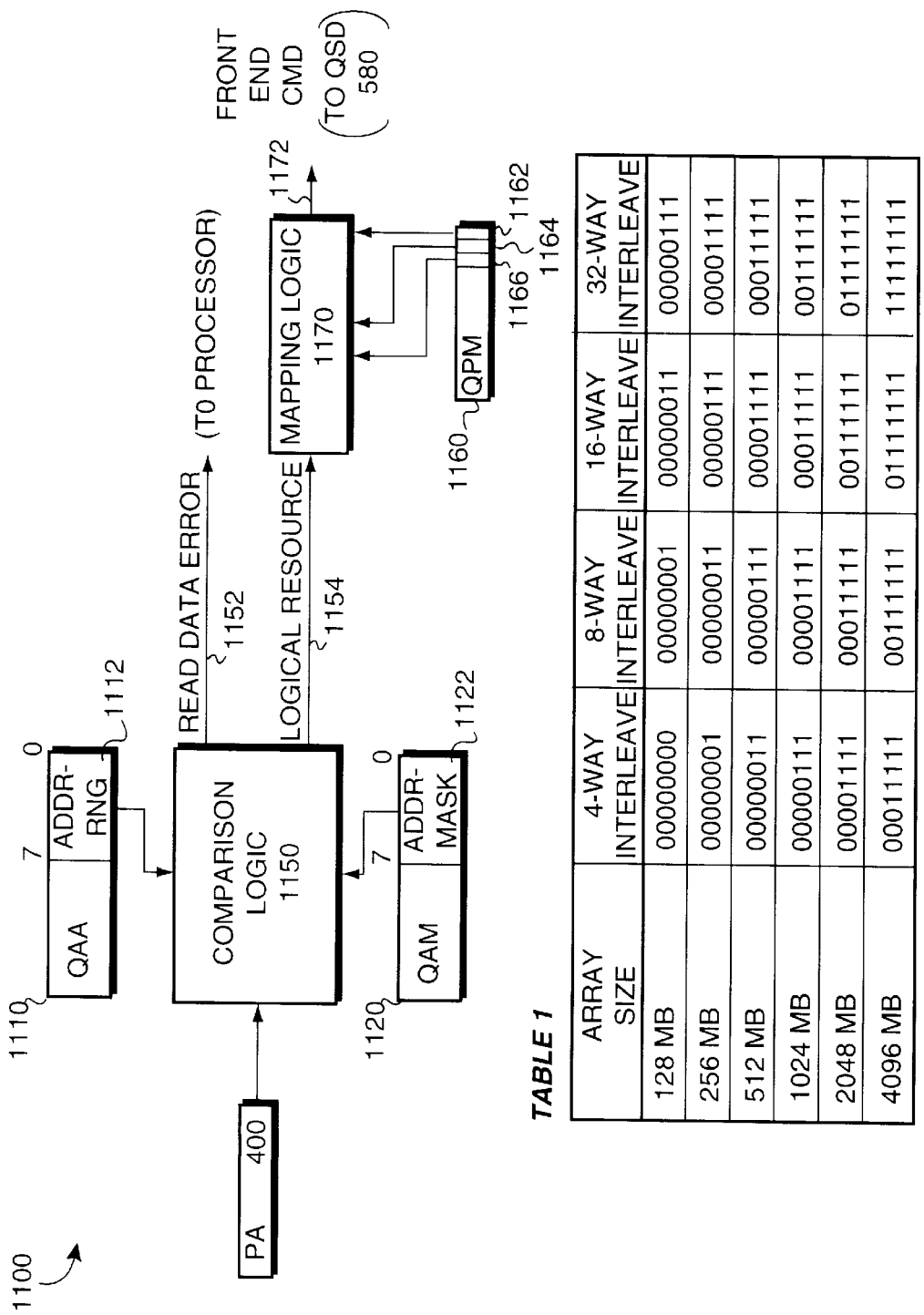
FIG. 11 is a diagram of Table 1 containing values for programming fields of memory array registers used in accordance with the present invention.

FIG. 10 is a highly schematized block diagram of portions of the QSA 1000 that pertain to the novel phantom resource mapping technique. In the illustrative embodiment, the QSA contains five (5) request queues 1010, each of which is associated with a corresponding processor (P0–P3 and IOP) of the SMP node. Each request queue may in turn hold eight (8) memory reference requests 1020 issued by the associated processor. Associated with each queue are sixty (60) request lines 1030, thirty-two (32) of which correspond to the banks of the fixed-resource memory configuration, sixteen (16) of which correspond to the ranks, eight (8) of which correspond to the arrays and four (4) of which correspond to the modules. In response to the various interleave decode translations at stage 710, appropriate ones of the sixty (60) request lines 1030 are asserted. These request lines are provided to the arbitration logic stage 730 along with various resource busy priority signals 1040 from the resource mapping and busy logic stage 720.

All address requests directed to the memory 600 pass through the arbitration stage 730. As noted, the arbiter operates as though there are 32 fully-interleaved memory banks, regardless of the specific configuration or resource population of the memory. Stacked-hybrid and less interleaved configurations are supported by "busying" groups of banks, arrays and modules, instead of arbitrating for subsets of these resources. This fixed-resource aspect of the address mapping technique contributes to the low latency path from the requesting processor to the Arb bus 550.

Hierarchical memory resources such as banks, arrays and modules are employed primarily because they map directly to the hardware infrastructure. In the case of ranks, however, they are employed primarily in support of the illustrative priority scheme, e.g. fair arbitration in the arbiter. Fair arbitration priority schemes include round-robin and rotating priority, each of which is either inefficient in operation or difficult in implementation. The illustrative embodiment described herein implements another conventional fair arbitration algorithm known as simple binary tree arbitration. Binary tree arbitration is preferably directed to arbitration among memory resources, and not processors, to optimize the operation of the memory system. Moreover, the arbitration policy specifies fair access on behalf of each of the memory resources (including phantom resources) with respect to the limited physical resources of the memory. Two levels define the arbitration policy: priority by memory bank (the first level) and processor (CPU) priority within a bank (the second level).

After a reference is issued to the ArbBus, the QSA responds by setting memory resources busy, preferably in sets of resources, wherein a set consists of a referenced bank along with its corresponding logical rank, array and module.

Depending upon the interleave of the system, the QSA may set multiple sets of resources busy. The multiple sets include the referenced set, as well as any phantom sets of resources that map to the same logical interleave unit as the referenced set.

In accordance with the invention, memory resources are set "busy" using the QSA resource mapping and busy logic 720, which preferably comprises a resource mapping stage 722 coupled to a resource busy stage 724. Referring again to FIG. 8A, the resource mapping stage 722 provides information regarding which memory resources are transitioning to the busy state to the resource busy logic 724; as described further herein, the information regarding which resources are transitioning to the busy state is derived from the physical address 400 of a request and the level of system interleave. The resource busy stage 724 preferably comprises a plurality of counters. The states of these counters are set subject to the result of the mapping in the resource mapping stage 722 and is thus set subject to the level of system interleave. The state of these counters is used, independent of the state of system interleave by arbiter stage logic 730, to determine which of the sixty (60) request lines 1030 are requesting access to available (i.e. not busy) memory resources.

Depending upon the number of requests for particular banks, the availability of various memory resources and the priority of the memory resources and requests, the arbitration logic 730 selects a particular request and grants it access to the requested memory resources. The granted request is driven over the Arb Bus 550 to memory and directory modules 620–623, 540. In response to the request on the Arb Bus, each of the DRAM arrays that map to the physical interleave unit referenced by the request immediately begin a DRAM access cycle. If the granted reference is a write ("victim") request, a signal (1025 at FIG. 10) is fed back to the actual P0–P3/IOP request queue 1010 so that the data associated with the victim can be provided to the appropriate memory bank for storage.

In the illustrative embodiment, there is a one-to-one correlation between each array of DRAMs on memory modules 620–623 and a corresponding array of DRAMs on directory module 540. Accordingly, when multiple memory arrays are cycled, corresponding directory arrays are cycled as well. However, each entry in the DRAMs on the directory module stores the cache state of a corresponding data block in memory. Therefore, the directory module does not respond to read and write (victim) commands in the same manner as the memory modules. Where the memory modules respond to read requests by executing a DRAM read cycle and respond to victims by executing a DRAM write cycle, the directory module responds to both read and write requests by executing an atomic read-modify-write sequence which includes both a DRAM read cycle and a DRAM write cycle. The read-modify-write sequence response to a read request, for example, updates the directory state to indicate that the requesting processor has obtained a copy of the requested block. The read-modify-write sequence for a victim command, on the other hand, updates the directory state to indicate that ownership of the referenced block has been transfered back to the main memory.

When a reference request is driven on the Arb Bus, each memory module and the directory module must determine which, if any, of their DRAM arrays map to the physical interleave unit addressed by the request. This determination is performed by the second interleave translation circuit 750 (FIG. 7). On each memory module, the second interleave translation circuit is implemented in the form of memory ("array mapping") interleave decode logic 1200. On the directory module it is implemented in the form of directory ("array mapping") interleave decode logic 1260. These various array mapping logic blocks allow a single request to activate multiple DRAM arrays within and among memory modules and within the directory module. The array mapping logic blocks also allow assignment of the physical interleave units to varied DIMM, or DIMM set, positions within the memory and directory hardware infrastructure.

Figure 12A:
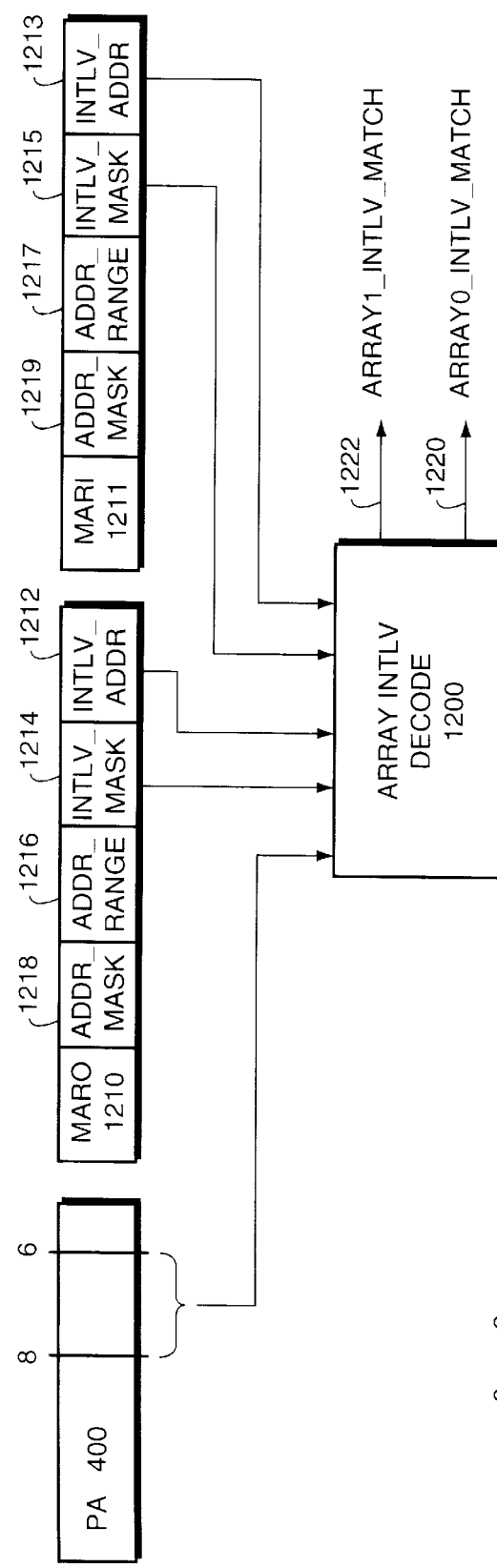
FIG. 12A is a highly schematized diagram of memory array mapping control logic located on a memory module component of FIG. 5.

FIG. 12A is a highly schematized diagram of the control logic on a memory module 620, comprising memory ("array mapping") interleave decode logic 1200 and memory array range registers Mem_Arr_Range0 (MAR0) 1210 and Mem_Arr_Range1 (MAR1) 1211. The Intlv_Addr field 1212 and the Intlv_Mask field 1214 of the MAR0 register of a memory module are programmable register fields used to indicate the physical interleave unit mapped to the set of DIMMs populated within a first of the two array DIMM connector sets on the memory module. Similarly, the Intlv_Addr field 1213 and the Intlv_Mask field 1215 of MAR1 register are programmable register fields used to indicate the physical interleave unit mapped to the set of DIMMs populated within the second of the two array DIMM connector sets on the memory module. The array interleave decode logic 1200 derives the two array match signals, Arr0_Intlv_Match 1220 and Arr1_Intl_Match 1222, from the Intlv_Addr fields 1212,1213, the Intlv_Mask fields 1214, 1215 and the Arb bus address, Addr, as described in the pseudocode segment I below. The Arr0_Intlv_Match and Arr1_Intlv_Match signals are used by the memory module to immediately initiate a requested DRAM cycle. They are also used, as described further herein, by the data selection logic function.

Pseudocode Segment I

Arr0_Intlv_Match=&((Addr<8:6>~^MAR0.Intlv_Addr<2:0>)|MAR0.Intlv_Mask<2:0>)

Arr1_Intlv_Match=&((Addr<8:6>~^MAR1.Intlv_Addr<2:0>)|IMAR1.Intlv_Mask<2:0>)

In the pseudocode segment I, the "~^" symbol represents a logical XNOR or comparison function, the "|" symbol represents a logical OR function and the "&" symbol represents a bit wise AND function. The segment compares a programmable number of address bits with a programmable interleave value and, if the address and interleave values match, signals an interleave match. If, for example, the MAR0 Intlv_Addr field is programmed to a value of '010' and the MAR0 Intlv_Mask field is programmed to a value of '100', only address bits <7:6> are compared with Intlv_Addr bits <1:0>. Thus addr<8:6> values of both '010' and '110' result in the assertion of Arr0_Intlv_Match.

A feature of the invention is the programmability of the Intv_Mask field to allow the system to support multiple levels of interleave. For example, programming the Intlv_Mask fields such that three significant address bits are used in the array match address comparisons (i.e. Intlv_Mask=000) enables the system to support up to eight (8) interleaved arrays, or thirty-two (32) interleaved banks. Likewise, programming the Intlv_Mask fields such that two significant address bits are used in the array match address comparisons (i.e. Intlv_Mask=100 for example) enables system support of up to four (4) interleaved arrays or sixteen (16) interleaved banks. Programmability of the Intlv_Addr field, on the other hand, is a system feature that allows support of stacking and varied configurations with respect to hardware population. Specifically, the various Intlv_Addr fields may be programmed such that any physical interleave unit may be assigned to any array on any module. Multiple Intlv_Addr fields may also be programmed to the same value to effectively map all of their corresponding arrays of DRAMs to the same physical interleave unit, thus stacking them.

Figure 12B:
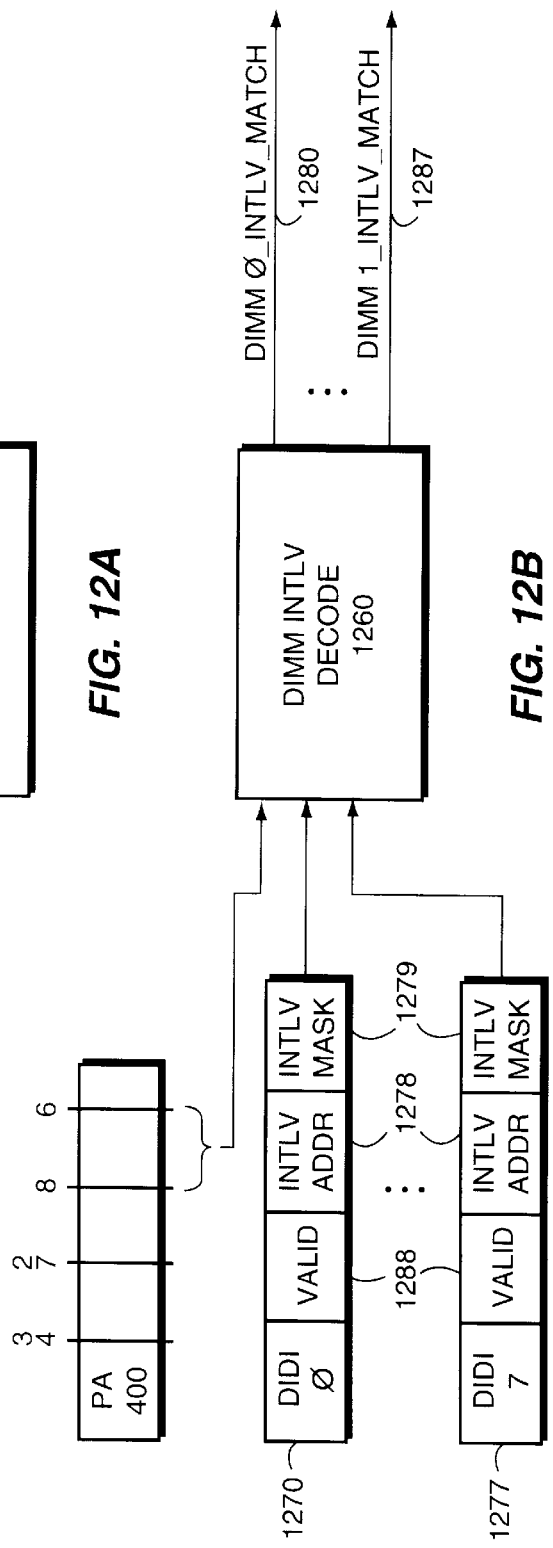
FIG. 12B is a highly schematized diagram of the directory mapping control logic located on the directory module component of FIG. 5.

Note that the directory module 540 implements a DIMM interleave decode block 1260 that is substantially identical to the memory array interleave decode block 1200. FIG. 12B is a highly schematized diagram of the control logic on directory module 540. As shown in FIG. 12B and the pseudocode below, the directory logic supports eight (8) DIMM match lines as opposed to the memory modules two (2) array match lines. This is because the directory supports eight (8) DIMMs on a single module whereas the memory supports two (2) arrays per module across four (4) memory modules. The DIMM match lines are supported by Intlv_Addr 1278 and the Intlv_Mask 1279 fields of Directory DIMM Interleave (DIDI) registers 1270–1277 similar to the Memory Array Range registers. The DIDI registers are programmed in a manner substantially identical to the manner in which the MAR registers are programmed. Note that there is no fixed relationship between a particular memory array hardware location and a particular directory DIMM hardware location; it is sufficient to have one comparably sized DIMM in a directory location for each array in the memory system.

Pseudocode Segment II

DIMM0_Intlv_Match=&((Addr<8:6>~^DIDI0.Intlv_Addr<2:0>)|DIDI0.Intlv_Mask<2:0>)
DIMM1_Intlv_Match=&((Addr<8:6>~^DIDI1.Intlv_Addr<2:0>)|DIDI1.Intlv_Mask<2:0>)
DIMM2_Intlv_Match=&((Addr<8:6>~^DIDI2.Intlv_Addr<2:0>)|DIDI2.Intlv_Mask<2:0>)
DIMM3_Intlv_Match=&((Addr<8:6>~^DIDI3.Intlv_Addr<2:0>)|DIDI3.Intlv_Mask<2:0>)
DIMM4_Intlv_Match=&((Addr<8:6>~^DIDI4.Intlv_Addr<2:0>)|DIDI4.Intlv_Mask<2:0>)
DIMM5_Intlv_Match=&((Addr<8:6>~^DIDI5.Intlv_Addr<2:0>)|DIDI5.Intlv_Mask<2:0>)
DIMM6_Intlv_Match=&((Addr<8:6>~^DIDI6.Intlv_Addr<2:0>)|DIDI6.Intlv_Mask<2:0>)
DIMM7_Intlv_Match=&((Addr<8:6>~^DIDI7.Intlv_Addr<2:0>)|DIDI7.Intlv_Mask<2:0>)

2. The Busy Resources Function

The busy resources function 860 is provided by the resource mapping and busy logic 720 of QSA 1000. As described previously herein, the bank mapping and busy logic 720 consists of two (2) sub-blocks: resource mapping stage 722 and resource busy stage 724. As noted, the resource mapping stage 722 derives information regarding which logical memory resources are transitioning to the busy state in response to a memory request on the Arb bus and the interleave level of the memory system, while the resource busy stage 724 comprises a plurality of counters used to indicate the current state of the various logical memory resources. The resource busy stage 724 uses the state transition information from the resource mapping stage 722 to determine the state of the counters.

Figure 13:
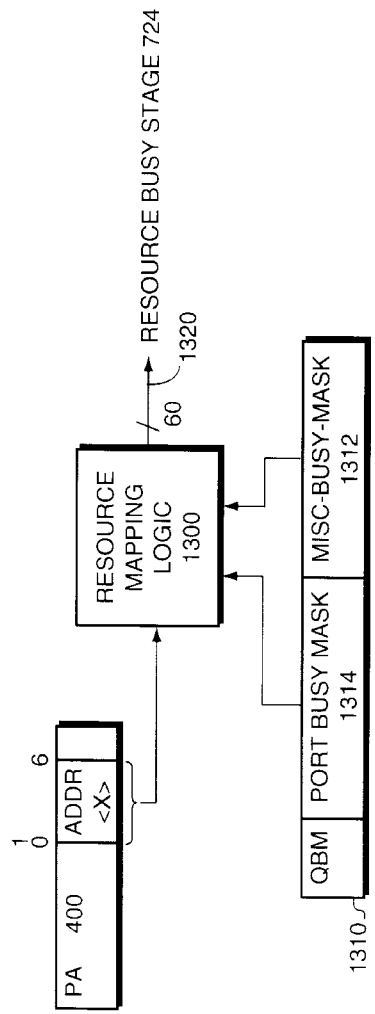
FIG. 13 is a highly schematized diagram of a resource busy mapping technique of the QSA in accordance with the invention.

FIG. 13 is a schematic diagram of resource mapping stage 722 comprising resource mapping logic 1300 operating on the contents of QSA busy mask register QSA_Busy_Mask (QBM) 1310 and physical address PA 400. The output of resource mapping logic 1300 comprises sixty (60) Set_Resource_Busy signals 1320 indicating which logical memory resources are transitioning to the busy state. Thirty-two (32) of the Set_Resource_Busy signals are used to transition the thirty-two (32) logical banks to the busy state, sixteen (16) of the signals are used to transtion the sixteen (16) logical ranks to the busy state, eight (8) of the signals are used to transition the eight (8) logical arrays to the busy state and four (4) of the signals are used to transition the four (4) logical modules to the busy state. These signals are organized into sets identical to the previously described sets of memory resources to which the signals correspond. Each set includes one Set_Bank_Busy signal, one Set_Rank_Busy signal, one Set_Array_Busy signal and one Set_Module_Busy signal.

Resource mapping logic 1300 specifically combines the values of a QBM Misc_Busy_Mask field 1312 and a Port_Busy_Mask field 1314 with the value of selected physical address bits Addr<10:6> to determine which Set_Resource_Busy signals to assert. The following pseudocode segments illustrate examples of the functionality of resource mapping logic 1300. Note that the "&" character represents a logical AND function, the "|" character represents a logical OR function and the "~" character represents a logical NOT function.

Pseudocode Segment III 1. busy_bank0=(&(QBM.Misc_Busy_Mask<2:0>|(~Addr<10>,~Addr<9>,~Addr<8>)))&~Addr<7>&~Addr<6>
2. busy_bank1=(&(QBM.Misc_Busy_Mask<2:0>|(~Addr<10>,~Addr<9>,~Addr<8>)))&~Addr<7>&Addr<6>
3. busy_bank2=(&(QBM.Misc_Busy_Mask<2:0>|(~Addr<10>,~Addr<9>,~Addr<8>)))&Addr<7>&~Addr<6>
4. busy_bank3=(&(QBM.Misc_Busy_Mask<2:0>|(~Addr<10>,~Addr<9>,~Addr<8>)))&Addr<7>&Addr<6>
5. busy_bank4=(&(QBM.Misc_Busy_Mask<2:0>|(~Addr<10>,~Addr<9>,Addr<8>)))&~Addr<7>&~Addr<6>
6. busy_bank5=(&(QBM.Misc_Busy_Mask<2:0>|(~Addr<10>,~Addr<9>,Addr<8>)))&~Addr<7>&Addr<6>
7. busy_bank6=(&(QBM.Misc_Busy_Mask<2:0>|(~Addr<10>,~Addr<9>,Addr<8>)))&Addr<7>&~Addr<6>
8. busy_bank7=(&(QBM.Misc_Busy_Mask<2:0>|(~Addr<10>,~Addr<9>,Addr<8>)))&Addr<7>&Addr<6>
9. busy_bank8=(&(QBM.Misc_Busy_Mask<2:0>|(~Addr<10>,Addr<9>,~Addr<8>)))&~Addr<7>&~Addr<6>
10. busy_bank9=(&(QBM.Misc_Busy_Mask<2:0>|(~Addr<10>,Addr<9>,~Addr<8>)))&~Addr<7>&Addr<6>
11. busy_bank10=(&(QBM.Misc_Busy_Mask<2:0>|(~Addr<10>,Addr<9>,~Addr<8>)))&Addr<7>&~Addr<6>
12. busy_bank11=(&(QBM.Misc_Busy_Mask<2:0>|(~Addr<10>,Addr<9>,~Addr<8>)))&Addr<7>&Addr<6>
13. busy_bank12=(&(QBM.Misc_Busy_Mask<2:0>|(~Addr<10>,Addr<9>,Addr<8>)))&~Addr<7>&~Addr<6>

14. busy_bank13=(&(QBM.Misc_Busy_Mask<2:0>|
    (~Addr<10>,Addr<9>,Addr<8>)))
    &~Addr<7>&Addr<6>
15. busy_bank14=(&(QBM.Misc_Busy_Mask<2:0>|
    (~Addr<10>,Addr<9>,Addr<8>)))
    &Addr<7>&~Addr<6>

Pseudocode Segment IV 1. busy_rank0=(&(QBM.Misc_Busy_Mask<2:0>|
   (~Addr<9>,~Addr<8>,~Addr<7>)))&~Addr<6>
2. busy_rank1=(&(QBM.Misc_Busy_Mask<2:0>|
   (~Addr<9>,~Addr<8>,~Addr<7>)))&Addr<6>
3. busy_rank2=(&(QBM.Misc_Busy_Mask<2:0>|
   (~Addr<9>,~Addr<8>,Addr<7>)))&~Addr<6>
4. busy_rank3=(&(QBM.Misc_Busy_Mask<2:0>|
   (~Addr<9>,~Addr<8>,Addr<7>)))&Addr<6>
5. busy_rank4=(&(QBM.Misc_Busy_Mask<2:0>|
   (~Addr<9>,Addr<8>,~Addr<7>)))&~Addr<6>
6. busy_rank5=(&(QBM.Misc_Busy_Mask<2:0>|
   (~Addr<9>,Addr<8>,~Addr<7>)))&Addr<6>
7. busy_rank6=(&(QBM.Misc_busy_Mask<2:0>|
   (~Addr<9>,Addr<8>,Addr<7>)))&~Addr<6>
8. busy_rank7=(&(QBM.Misc_Busy_Mask<2:0>|
   (~Addr<9>,Addr<8>,Addr<7>)))&Addr<6>
9. busy_rank8=(&(QBM.Misc_Busy_Mask<2:0>|
   (~Addr<9>,~Addr<8>,~Addr<7>)))&~Addr<6>
10. busy_rank9=(QBM.Misc_Busy_Mask<2:0>|
    (~Addr<9>,~Addr<8>,~Addr<7>)))&Addr<6>
11. busy_rank10=(&(QBM.Misc_Busy_Mask<2:0>|
    (~Addr<9>,~Addr<8>,Addr<7>)))&~Addr<6>
12. busy_rank11=(&(QBM.Misc_Busy_Mask<2:0>|
    (~Addr<9>,~Addr<8>,Addr<7>)))&Addr<6>
13. busy_rank12=(&(QBM.Misc_Busy_Mask<2:0>|
    (~Addr<9>,Addr<8>,~Addr<7>)))&~Addr<6>
14. busy_rank13=(&(QBM.Misc_Busy_Mask<2:0>|
    (~Addr<9>,Addr<8>,~Addr<7>)))&Addr<6>
15. busy_rank14=(&(QBM.Misc_Busy_Mask<2:0>|
    (~Addr<9>,Addr<8>,Addr<7>)))&~Addr<6>
16. busy_rank15=(&(QBM.Misc_Busy_Mask<2:0>|
    (~Addr<9>,Addr<8>,Addr<7>)))&~Addr<6>

Pseudocode Segment V 1. busy_array0=&(QBM.Misc_Busy_Mask<2:0>|
   (~Addr<8>,~Addr<7>,~Addr<6>))
2. busy_array1=&(QBM.Misc_Busy_Mask<2:0>|
   (~Addr<8>,~Addr<7>,Addr<6>))
3. busy_array2=&(QBM.Misc_Busy_Mask<2:0>|
   (~Addr<8>,Addr<7>,~Addr<6>))
4. busy_array3=&(QBM.Misc_Busy_Mask<2:0>|
   (~Addr<8>,Addr<7>,Addr<6>))
5. busy_array4=&(QBM.Misc_Busy_Mask<2:0>|
   (Addr<8>,~Addr<7>,~Addr<6>))
6. busy_array5=&(QBM.Misc_Busy_Mask<2:0>|
   (Addr<8>,~Addr<7>,Addr<6>))
7. busy_array6=&(QBM.Misc_Busy_Mask<2:0>|
   (Addr<8>,Addr<7>,~Addr<6>))
8. busy_array7=&(QBM.Misc_Busy_Mask<2:0>|
   (Addr<8>,Addr<7>,Addr<6>))

Pseudocode Segment VI

1. Set_Module0_Busy=&(QBM.Port_Busy_
   Mask<1:0>|(~Addr<7>,~Addr<6>))
2. Set_Module1_Busy=&(QBM.Port_Busy_
   Mask<1:0>|(~Addr<7>,Addr<6>))
3. Set_Module2_Busy=&(QBM.Port_Busy_
   Mask<1:0>|(Addr<7>,~Addr<6>))
4. Set_Module3_Busy=&(QBM.Port_Busy_
   Mask<1:0>|(Addr<7>,Addr<6>))

Tables 2 and 3 illustrate the programming values for the Misc_Busy_Mask field 1312 and Port_Busy_Mask field 1314 of QBM register 1310 as a function of memory interleave factors. Note that the level of masking increases as the level of interleaving decreases because the masking function of resource mapping logic 1300 activates multiple sets of Set_Resource_Busy signals and, in turn, transitions multiple sets of memory resources to the busy state. Note also that the values of the Busy_Bank, Busy_Rank, and Busy_Array signals are determined by the value of the Misc_Busy_Mask register field, whereas the values of the Set_Module_Busy signals are determined by the contents of the Port_Busy_Mask register field. By applying masking functions for modules that are independent from the masking function for all other resources, resource mapping logic 1300 can support a variety of configurations for a particular level of interleave.

Figure 14:
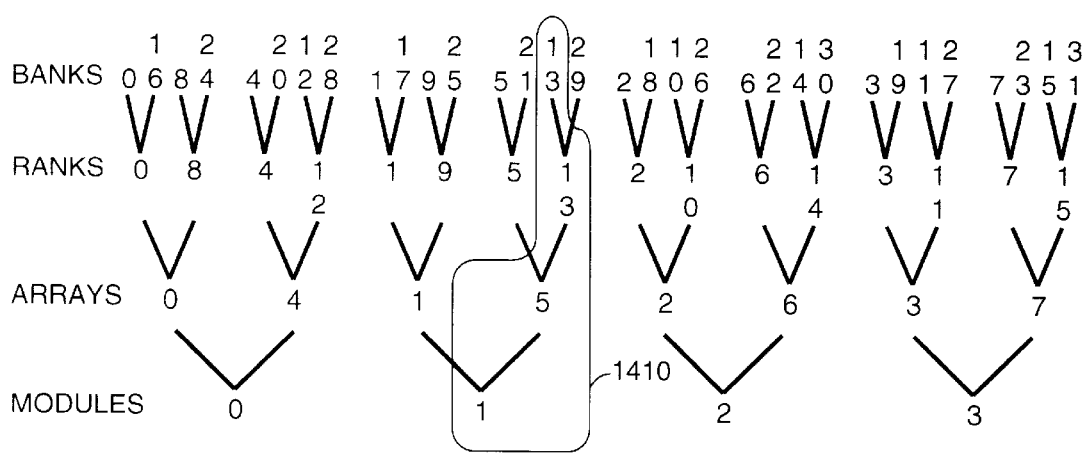
FIG. 14 is a highly schematized diagram of a first logical memory system that may be advantageously used with the present invention.

Consider the logical memory system 1400 of FIG. 14 wherein the illustrated system is populated with thirty-two (32) interleave units. As such, according to Table 2, the Misc_Buy_Mask field is programmed to a value of '000' while, according to Table 3, the Port_Busy_Mask field is programmed to a value of '00'. As a further example, consider the situation wherein a reference with an Addr<10:6> value '01101' (13 decimal) is transmitted over the Arb bus. According to the above equations, the reference causes resource mapping logic 1300 to activate only the Set-Resource_Busy signals associated with memory resources within resource set 1410.

Figure 15:
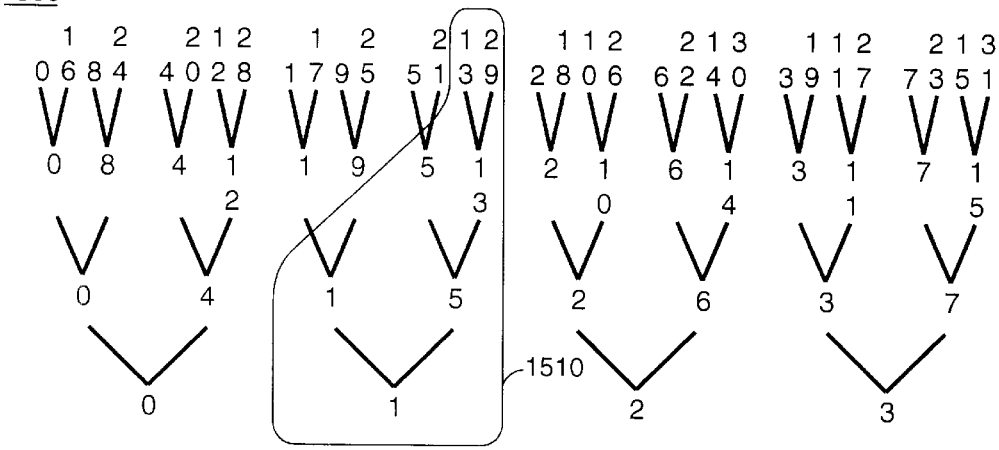
FIG. 15 is a highly schematized diagram of a second logical memory system that may be advantageously used with the present invention.
Figure 16:
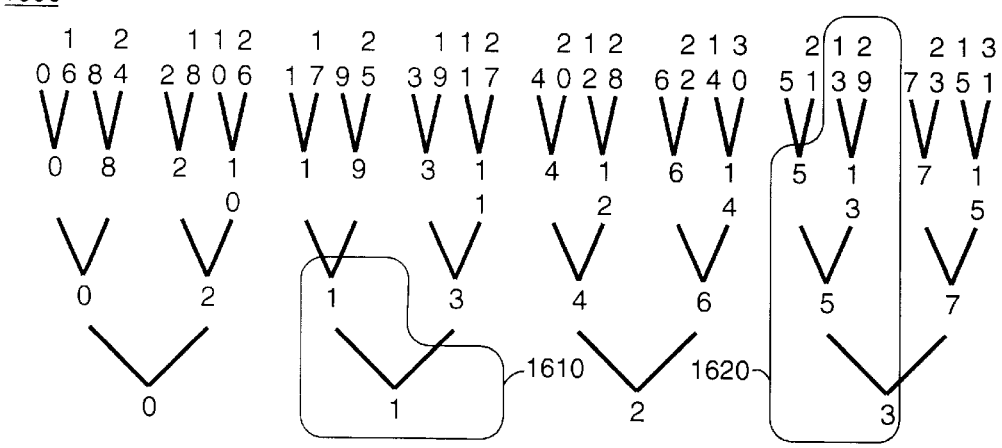
FIG. 16 is a highly schematized diagram of a third logical memory system that may be advantageously used with the present invention.

Consider also the logical memory systems 1500 and 1600 shown in FIGS. 15 and 16, respectively, wherein both illustrated systems are populated with only sixteen (16) interleave units. As such, according to Table 2, the Misc_Busy_Mask in both cases is programmed to a value of '100'. As a first example, assume that the Port_Busy_Mask is programmed to a value of '00' and a reference with an Addr<10:6> value '01101' (13 decimal) is transmitted over the Arb bus. The reference will cause resource mapping logic 1300 to activate the Set_Resource_Busy signals associated with memory resources within resource set 1510 in FIG. 15. As a second example, assume that the Port_Busy_Mask is programmed to a value of '10' and the same reference with an Addr<10:6> value '01101' (13 decimal) is transmitted on the Arb bus. This time the reference will cause resource mapping logic 1300 to activate the Set_Resource_Busy signals associated with memory resources within both resource sets 1610 and 1620 (FIG. 16).

These latter two examples illustrate how the Port_Busy_Mask can be used to support a particular level of interleave for multiple physical interleave configurations. The first example, illustrated in FIG. 15, illustrates how a system should be programmed when four (4) physical array interleave units are populated such that there is one array interleave unit populated on each of four (4) modules. The second examples, illustrated in FIG. 16, show how a system should be programmed when four (4) physical array interleave units are populated such that there are two (2) array interleave units populated on each of two (2) modules.

3. The Data Selection Function

When a memory system is populated with arrays that are stacked within its interleave units, each reference causes the memory system to activate multiple sets of memory resources. In the case of a read reference, each array in the stack within the addressed interleave unit provides a data item for the processor. To correctly service a processor's requested read reference, the correct one of these data items is selected and returned to the processor. In the case of a write reference, a write data item is written to only the correct one of the stacked array elements within the addressed interleave unit. In the illustrative embodiment read and write references often occur in pairs that address the same interleave unit; despite this arrangement, it is possible for read and write references within a pair to address different arrays within a stacked interleave unit. Therefore, to correctly service a processor's requested write reference, the write data item is steered to the correct array within the addressed interleave unit by means independent of read data selection.

Both read and write references present the same set of problems for the directory. In response to both of these references, the directory performs a read operation followed by a write operation. As with a memory read, a directory read operation requires selection of data from among the responses of multiple stacked directory DIMMs. Unlike a memory write, however, a directory write operation is always paired with a directory read and always addresses the same array within a stack as its associated read. As such no special logic is needed to support directory write operations.

Memory Read Data Selection

Figure 17:
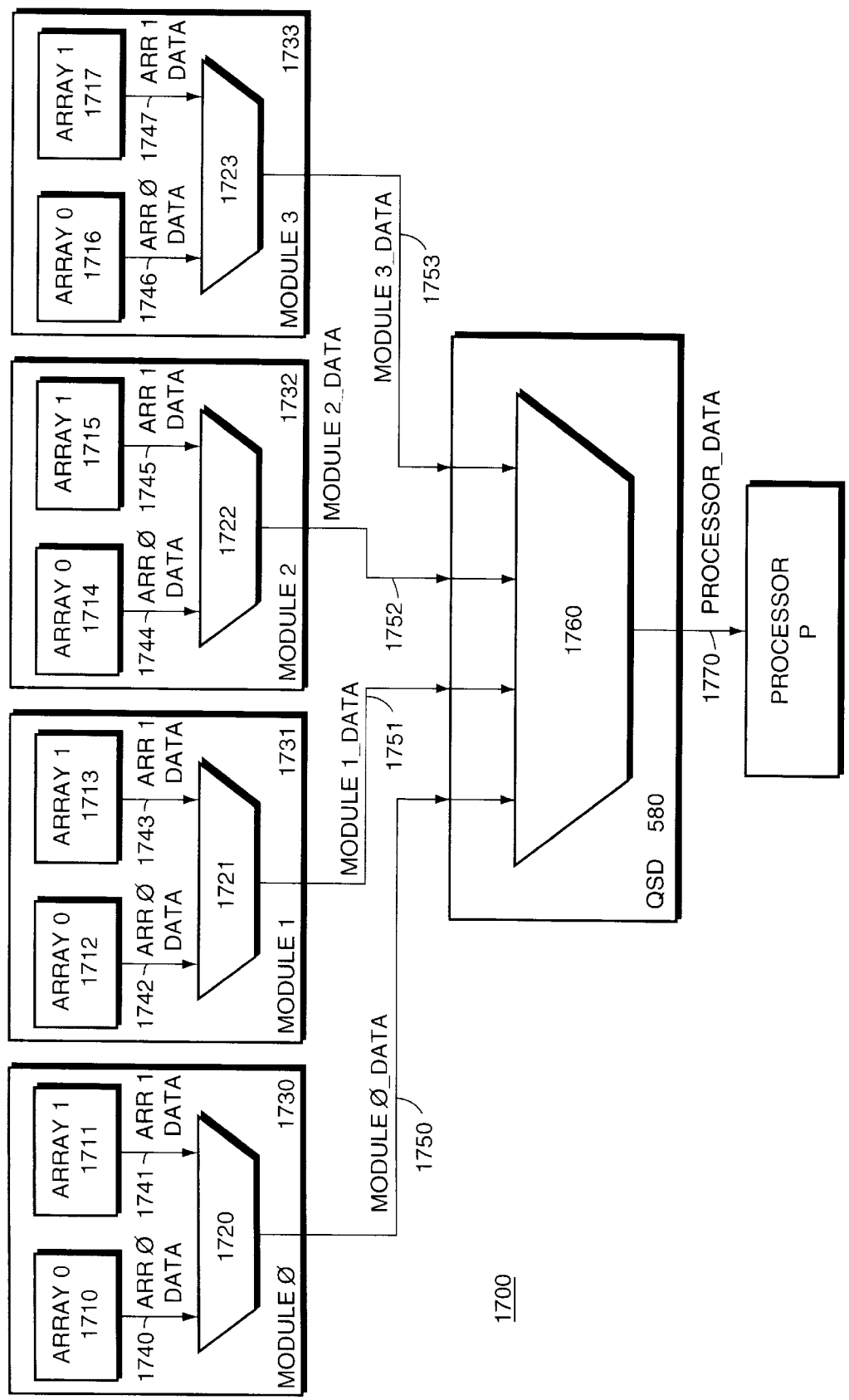
FIG. 17 is a schematic block diagram of a read data path between the processor and memory components of FIG. 5.

FIG. 17 is a schematic block diagram of a read data path 1700 between eight (8) possible memory DRAM arrays 1710–1717 and a representative one P of processors 502, 504, 506 and 508. The read data path relates directly to the memory hardware infrastructure as opposed to any logical or physical interleave units. Any one of the DRAM arrays 1710–1717 can be programmed to map to any one of the eight (8) possible array interleave units. The data path 1700 comprises two levels of multiplexing: one to multiplex Array_Data signals 1740–1747 via multiplexers 1720–1723 onto ModuleX_Data signals 1750–1753; and a second level to multiplex ModuleX_Data signals 1750–1753 via QSD multiplexer 1760 onto Processor_Data signals 1770. Each of the multiplexers 1720–1723 is controlled by logic implemented on its associated memory module. The QSD multiplexer 1760 is controlled by logic in QSA 1000.

Figure 18:
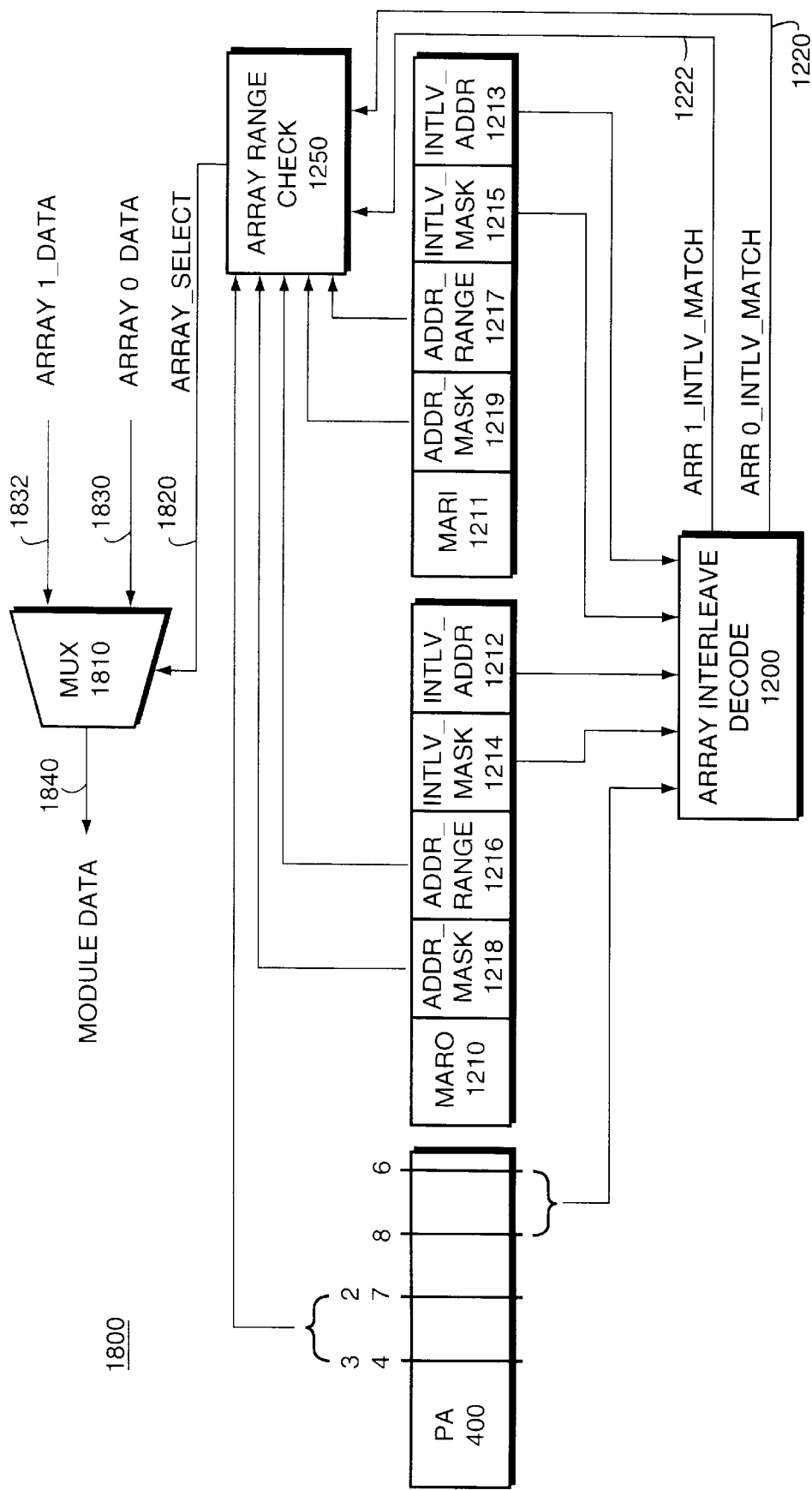
FIG. 18 is a highly schematized diagram of read reference control logic located on a memory module component of FIG. 5.

FIG. 18 is a highly schematized diagram of read reference control logic 1800 located on a memory module 620 and comprising memory array interleave decode logic 1200, memory array range registers Mem_Arr_Range0 (MAR0) 1210 and Mem_Arr_Range1 (MAR1) 1211, array range check logic 1250 and data multiplexer 1810, the latter of which is a representative one of multiplexers 1720–1723. As described previously, memory array interleave decode logic 1200 and the Intlv_Mask and Intlv_Addr fields of the memory array range registers MAR0 1210 and MAR1 1211 function as components of the primary memory access path 725 as well as the read reference control logic 1800. In the primary memory access path, the array interleave logic outputs, Arr0_Intlv_Match 1220 and Arr1_Intlv_Match 1222, are used to activate one or both of the memory DRAM arrays on the memory module. In the memory read reference control logic 1800, these outputs are fed into array range check logic 1250, where they are combined with address bits<34:27> of physical address 400 and the Addr_Mask 1218, 1219 and Addr_Range 1216, 1217 register fields of the MAR0 and MAR1 registers to form an Array_Select output signal 1820 of array range check logic 1250. Array_Select 1820 is used to select which of Array0_Data 1830 and Array1_Data 1832 is multiplexed onto Module_Data 1840 (which is a representative one of ModuleX_Data signals 1750–1753).

The logic within array range check 1250 performs its function in two steps. First it determines if the referenced address falls within the address range associated with either of the arrays described by the MAR0 and MAR1 registers. This determination is described in pseudocode segment VII below. Intuitively, the result Arr0_Addr_Rng_Match of equation 1 within segment VII is the logical result of a comparison between only those address bits<34:27> in physical address 400 and those address bits in register field MAR0 Intlv_Addr that are not masked out by a '1' in a corresponding position in the MAR0 Intlv_Mask register field. Similarly, the result Arr1_Addr_Rng_Match of equation 2 is the logical result of a comparison between only those address bits<34:27> in physical address 400 and those address bits in register field MAR1 Intlv_Addr that are not masked out by a '1' in a corresponding position in the MAR1 Intlv_Mask register field.

Pseudocode Segment VII

1. Arr0_Addr_Rng_Match=& ((Addr<34:27>~^MAR0.Intlv_Addr<34:27>) |MAR0.Intlv_Mask<34:27>)
2. Arr1_Addr_Rng_Match=& ((Addr<34:27>~^MAR1.Intlv_Addr<34:27>) |MAR1.Intlv_Mask<34:27>)

The values for the Addr_Mask fields 1218, 1219 are programmed according to Table 1, wherein their values are determined by array size (or capacity) and the interleave factor of the system. Collectively, the sizes of arrays and the system interleave factors determine the size of the address space into which an array is mapped. For example, a 128 MB array in a thirty-two (32) way interleaved system shares an address space with seven (7) other 128 MB arrays, forming a single 1024 MB address space. On the other hand, a 1024 MB array in a four (4) way interleaved system occupies a single 1024 MB address space. Since both of these configurations map to a common sized address space, they are both assigned the same address mask, as shown in Table 1. Note that the address masking functions increase with the sizes of their corresponding address spaces because less address bits are needed to identify a unique instance of a large address space and more bits are needed to identify specific data items within a large address space.

The values of Arr0_Addr_Rng_Match and Arr1_Addr_Rng_Match are combined with the values of Arr0_Intlv_Match and Arr1_Intlv_Match in the second step of the array range check 1250 function to determine the value of the Array_Select signal 1820. Specifically, if physical address 400 results in both an interleave match and an address range match for array 0, as determined by both Arr0_Addr_Rng_Match and Arr0_Intlv_Match evaluating to a TRUE state, then Array_Select 1820 is set to select the Array0_Data 1830 input of multiplexer 1810. If physical address 400 results in both an interleave match and an address range match for array 1, as determined by Arr1_Addr_Rng_Match and Arr1_Intlv_Match evaluating to the TRUE state, then Array_Select 1820 is set such that it selects the Array1_Data 1832 input of multiplexer 1810. If physical address 400 does not match both the interleave unit and address range for either array 0 or array 1, then the array range check 1250 function arbitrarily selects a default input of multiplexer 1810.

It should be noted that if the two arrays on a module are interleaved together, a physical address may result in an address range match for both arrays, but an interleave mismatch. If the two arrays are stacked within the same interleave unit, a physical address may result in an interleave match for both arrays, but an address range mismatch.

Figure 19:
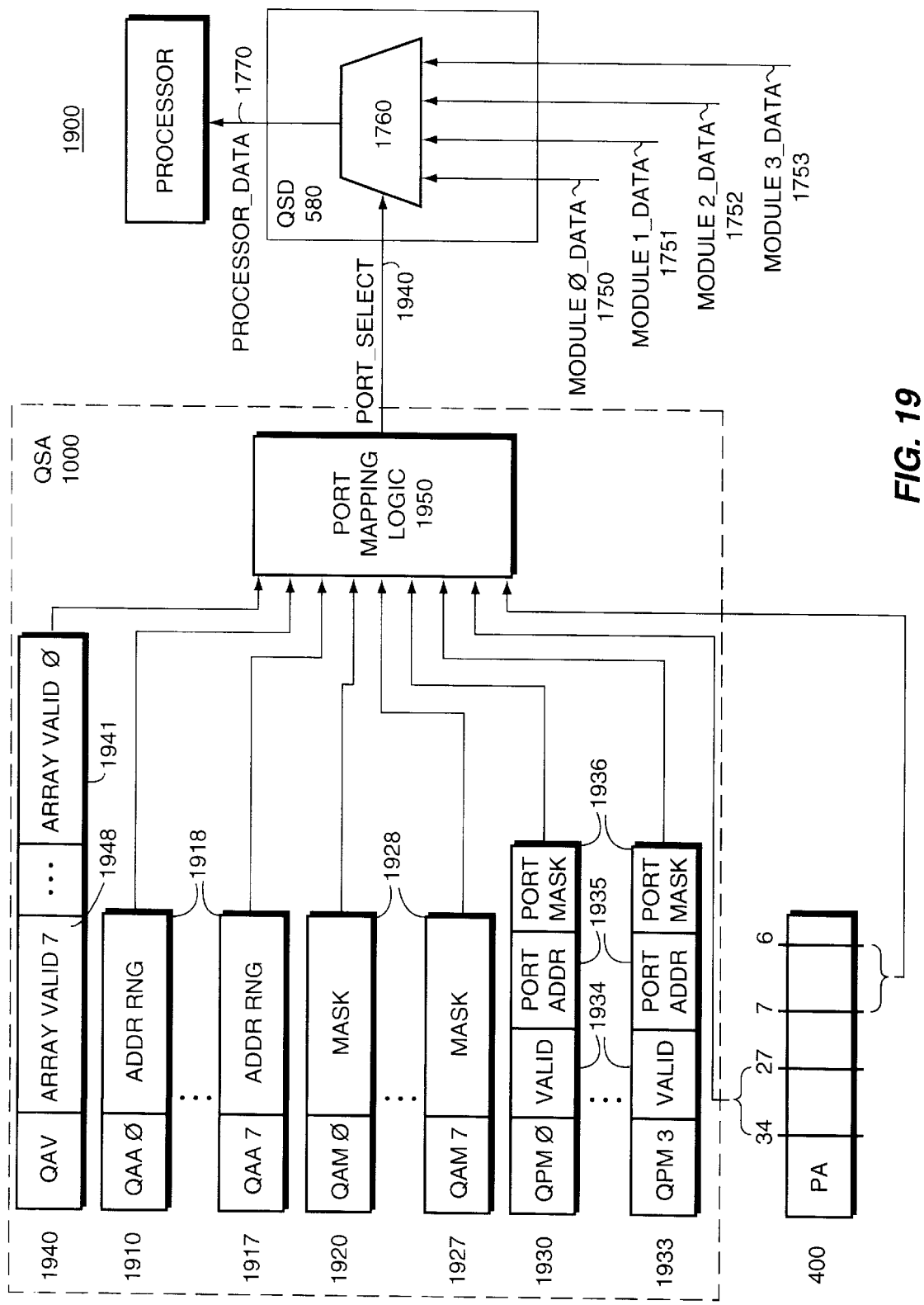
FIG. 19 is a highly schematized diagram of read reference control logic located on the switch component of FIG. 5.

FIG. 19 is a highly schematized diagram of read reference control logic 1900 located on QSA 1000 and comprising QSA port mapping logic 1950, QSA Array Address registers 1910–1917 (QAA0–QAA7), QSA Array Mask registers 1920–1927 (QAM0–QAM7), QSA Port Map registers 1930–1933 (QPM0–QPM3) and QSA Array Valid register 1940 (QAV). The QSA port mapping logic 1950 uses the Addr_Rng fields 1918 of the QAA registers combined with the Addr_Mask fields 1928 of the QAM registers, the Valid, Port_Addr and Port_Mask fields 1934–1936, respectively, of the QPM registers and the Array_Valid0 through Array_Valid7 fields 1941–1948 of the QAV register to derive its Port_Select output signals 1960. These outputs are used by QSD multiplexer 1760 to multiplex the four (4) sets of ModuleX_Data signals 1750–1753 from the four (4) memory modules to the Processor_Data signals 1770. The logic used to derive the Port_Select outputs 1960 is described in the pseudocode segment VIII below.

Pseudocode Segment VIII 1. array0_mg_hit=(&((Addr<34:27>~^QAA0.Addr_Rng<34:27>)|QAM0.Addr_Mask<34:27>)) &QAV.Array_Valid0
2. array4_mg_hit=(&((Addr<34:27>~^QAA4.Addr_Rng<34:27>)|QAM4.Addr_Mask<34:27>)) &QAV.Array Valid4
3. port0_range_hit=&((Addr<7:6>~^QPM0.Port_Addr<1:0>)|QPM0.Port_Mask<1:0>)
4. port0_select=port0_range_hit & QPM0.Port_Valid &(array0_mg_hit|array4_mg_hit)
5. array1_mg_hit=(&((Addr<34:27>~^QAA1.Addr_Rng<34:27>)|QAM1.Addr_Mask<34:27>)) &QAV.Array_Valid1
6. array5_mg_hit=(&((Addr<34:27>~^QAA5.Addr_Rng<34:27>)|QAM5.Addr_Mask<34:27>)) &QAV.Array_Valid5
7. port1_range_hit=&((Addr<7:6>~^QPM1.Port_Addr<1:0>)|QPM1.Port_Mask<1:0>)
8. port1_select=port1_range_hit &QPM1.Port_Valid &(array1_mg_hit|array5_mg_hit)
9. array2_mg_hit=(&((Addr<34:27>~^QAA2.Addr_Rng<34:27>)|QAM2.Addr_Mask<34:27>)) &QAV.Array_Valid2
10. array6_mg_hit=(&((Addr<34:27>~^QAA6.Addr_Rng<34:27>)|QAM6.Addr_Mask<34:27>)) &QAV.Array_Valid6
11. port2_range_hit=&((Addr<7:6>~^QPM2.Port_Addr<1:0>)|QPM2.Port_Mask<1:0>)
12. port2_select=port2_range_hit&QPM2. Port_Valid&(array2_hit|array6_mg_hit)
13. array3_mg_hit=(&((Addr<34:27>~^QAA3.Addr_Rng<34:27>)|QAM3.Addr_Mask<34:27>)) &QAV.Array_Valid3
14. array7_mg_hit=(&((Addr<34:27>~^QAA7.Addr_Rng<34:27>)|QAM7.Addr_Mask<34:27>)) &QAV.Array_Valid7
15. port3_range_hit=&((Addr<7:6>~^QPM3.Port_Addr<1:0>)|QPM3.Port_Mask<1:0>)
16. port3_select=port3_range_hit&QPM3. Port_Valid&(array3_mg_hit|array7_mg_hit)

Note that the equations in pseudocode segment VIII parallel the equations employed by the memory modules for the purpose of read data selection. These latter equations are summarized in pseudocode segments I and VII. Where each of the four (4) memory modules performs two (2) masked address compares with physical address bits <34:27> (pseudocode segment VII), the QSA performs a corresponding eight (8) masked address compares with address bits<34:27>. Similarly, where each of four (4) memory module performs two (2) masked interleave address compares with physical address bits <8:6> (pseudocode segment I), the QSA performs four (4) corresponding masked interleave compares with address bits<7:6>. The QSA's function uses only two address bits because it need only select between four (4) modules as opposed to eight (8) arrays.

Memory Write Data Selection

In the illustrative embodiment, memory read commands are paired with associated memory write commands and, as a result of the issuance of the paired read command to the Arb Bus, both read and write data movement sequences occur. In particular, data movement commands that steer read data to the issuing processor and write data to the memory for update are derived from the address of the read command on the Arb Bus. Note that it is possible for the read and write commands to target different arrays within a stacked interleave unit, and for stacked arrays to reside on different modules; therefore, it is not possible for a write data movement sequence controlled by the address of a read command to determine the correct array location for its associated write command. As such, the write data path logic in the illustrative embodiment includes a broadcast function which transmits copies of the write data to all memory modules that could possibly be targeted by the write data. Later, when the write command is issued to the Arb Bus, the memory modules decode the array that is actually targetted by the command and direct the write data accordingly.

Figure 20:
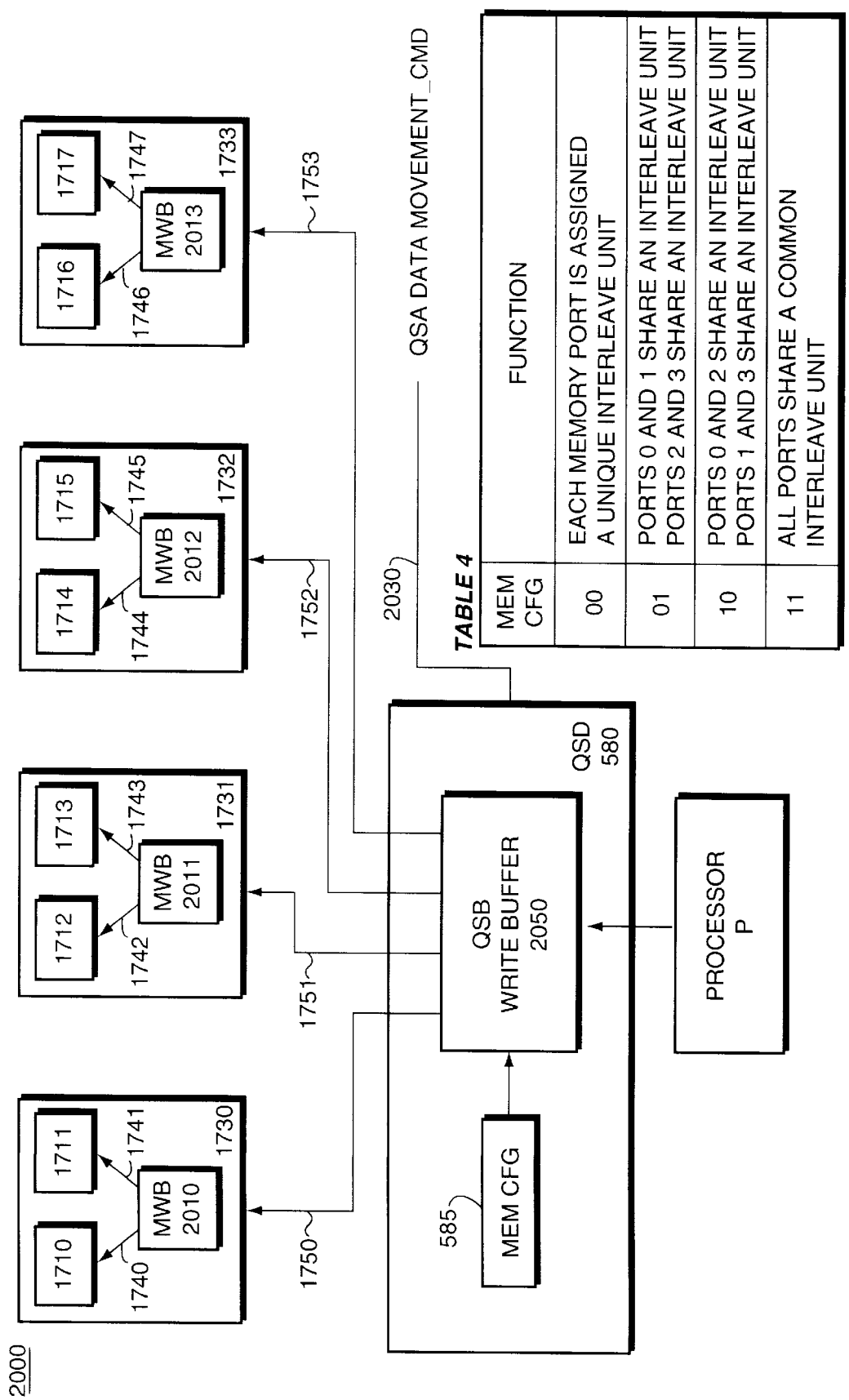
FIG. 20 is a schematic block diagram of a write data path between the processor and memory components of FIG. 5.

FIG. 20 is a schematic block diagram of a write data path 2000 between a representative one P of processors 502, 504, 506 and 508, and the eight (8) possible memory DRAM arrays 1710–1717. The write data path 2000 relates directly to the memory hardware infrastructure as opposed to logical or physical interleave units. Any one of the DRAM arrays 1710–1717 can be programmed to map to any one of the eight (8) possible array interleave units. The data path 2000 comprises two levels of data steering logic: one to broadcast data from processor P to one or more of ModuleX_Data signals 1750–1753 by means of QSD write buffer logic 2050; a second to steer data to at most one of Array_Data signals 1740–1747 via memory write buffers 2010–2013.

The QSD write buffer logic 2050 determines which of the ModuleX_Data signals 1750–1753 it should broadcast data over based upon a data movement command 2030 from the QSA and the state of QSD memory configuration register MemCfg 585. Data movement command 2030 is derived from the same port mapping logic 1950 and Port_Select signals 1960 as are used to in the memory read data path, and includes the memory module number from which the read associated with a particular write command sources its data. If the system is organized in a stacked manner, this module number may specify just one out of two or four stacked memory modules. In such case, MemCfg 585 is used, as described in Table 4, to determine which other memory modules coexist in the same stacked interleave unit as the specified module.

Accordingly, the QSD write buffer logic 2050 drives a copy of write data to each of the modules within the same stacked interleave unit as the module specified by the read command. If, for example, MemCfg 585 is programmed to a value of '00' and a read command, with an associated write command, fetches a data item from memory module 2, the QSD responds by driving the associated write data only to module 2. If, on the other hand, MemCfg 585 is programmed to a value of '01' and a read command, with an associated write command, fetches a data item from module 2, the QSD responds by driving the associated write data to both module 2 and module 3. If MemCfg 585 is programmed to a value of '11' and a read command, with an associated write command, fetches a data item from module 2, the QSD responds by driving the associated write data to all memory modules. Data is steered through memory write buffers 2010–2013 on memory modules 1730–1733 by means of the same array interleave decode logic 1200, array range check logic 1250 and Array_Select signals 1820 used in the memory read data path memory module.

Directory Data Selection

The directory data selection function operates in a manner substantially similar to the memory module read data selection function. Instead of selecting between two (2) arrays of data, however, the directory logic selects between eight (8) DIMMs of data. In particular, the directory data selection does not involve the steering of data to a processor; rather, it consists of selecting a data item solely within the confines of the directory module.

Figure 21:
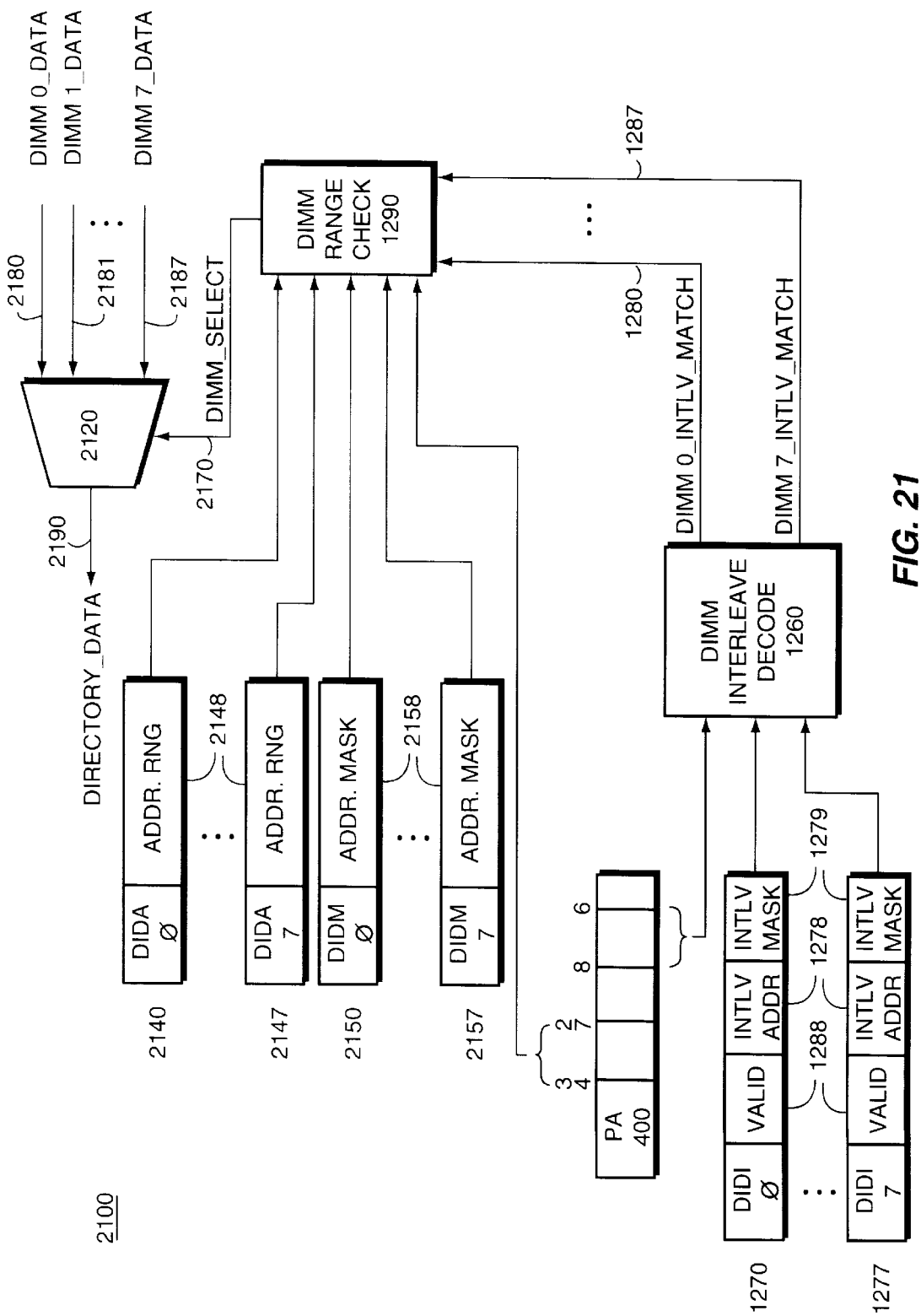
FIG. 21 is a highly schematized diagram of read reference control logic located on a directory module component of FIG. 5.

FIG. 21 is a highly schematized diagram of read reference control logic 2100 located on a directory module 540 and comprising directory array (DIMM) interleave decode logic 1260, DIMM range check logic 1290, directory DIMM interleave registers Dir_DIMM_Intlv (DIDI0–7) 1270–1277, directory DIMM address range registers Dir_DIMM_Addr (DIDA0–7) 2140–2147, directory DIMM address mask Dir_DIMM_Mask (DIDM0–7) 2150–2157 and data multiplexer 2120. The directory implements DIMM selection logic in substantially the same two step process as the memory. DIMM interleave decode logic 1260 first performs a masked interleave address compare using address bits<8:6> of physical address 400 and the Valid, Intlv_Addr and Intlv_Mask fields 1288, 1278–1279, respectively, of the DIDI registers 1270–1277 to derive the DIMM_Intlv_Match signals 1280–1287. DIMM range check logic 1290 then combines the DIMM_Intlv_Match signals 1280–1287 with the Addr_Rng field 2148 of the DIDA registers 2140–2147, the Addr_Mask fields 2158 of the DIDM registers 2150–2157 and the address bit<34:27> of physical address 400 to derive DIMM_Select signal 2170. The logic used in DIMM interleave decode logic 1260 and DIMM range check logic 1290 is summarized in pseudocode segment IX.

Pseudocode Segment IX

1. DIMM0_intlv_hit=(&((Addr<8:6>~^DIDI0.Intlv_Addr<2:0>)|DIDI0.Intlv_Mask<2:0>))&DIDI0.Intlv_Valid
2. DIMM1_intlv_hit=(&((Addr<8:6>~^DIDI1.Intlv_Addr<2:0>)|DIDI1.Intlv_Mask<2:0>))&DIDI1.Intlv_Valid
3. DIMM2_intlv_hit=(&((Addr<8:6>~^DIDI2.Intlv_Addr<2:0>)|DIDI2.Intlv_Mask<2:0>))&DIDI2.Intlv_Valid
4. DIMM3_intlv_hit=(&((Addr<8:6>~^DlDI3.Intlv_Addr<2:0>)|DIDI3.Intlv_Mask<2:0>))&DIDI3.Intlv_Valid
5. DIMM4_intlv_hit=(&((Addr<8:6>~^DIDI4.Intlv_Addr<2:0>)|DIDI4.Intlv_Mask<2:0>))&DIDI4.Intlv_Valid
6. DIMM5_intlv_hit=(&((Addr<8:6>~^DIDI5.Intlv_Addr<2:0>)|DIDI5.Intlv_Mask<2:0>))&DIDI5.Intlv_Valid
7. DIMM6_intlv_hit=(&((Addr<8:6>~^DIDI6.Intlv_Addr<2:0>)|DIDI6.Intlv_Mask<2:0>))&DIDI6.Intlv_Valid
8. DIMM7_intlv_hit=(&((Addr<8:6>~^DIDI7.Intlv_Addr<2:0>)|DIDI7.Intlv_Mask<2:0>))&DIDI7.Intlv_Valid
9. DIMM0_range_hit=&((Addr<34:27>~^DIDA0.Addr_Rng<34:27>)|DIDM0.Addr_Mask<34:27>)
10. DIMM1_range_hit=&((Addr<34:27>~^DIDA1.Addr_Rng<34:27>)|DIDM1.Addr_Mask<34:27>)
11. DIMM2_range_hit=&((Addr<34:27>~^DIDA2.Addr_Rng<34:27>)|DIDM2.Addr_Mask<34:27>)
12. DIMM3_range_hit=&((Addr<34:27>~^DIDA3.Addr_Rng<34:27>)|DIDM3.Addr_Mask<34:27>)
13. DIMM4_range_hit=&((Addr<34:27>~^DIDA4.Addr_Rng<34:27>)|DIDM4.Addr_Mask<34:27>)
14. DIMM5_range_hit=&((Addr<34:27>~^DIDA5.Addr_Rng<34:27>)|DIDM5.Addr_Mask<34:27>)
15. DIMM6_range_hit=&((Addr<34:27>~^DIDA6.Addr_Rng<34:27>)|DIDM6.Addr_Mask<34:27>)
16. DIMM7_range_hit=&((Addr<34:27>~^DIDA7.Addr_Rng<34:27>)|DIDM7.Addr_Mask<34:27>)
17. DIMM0_Select=DIMM0_intlv_hit&DIMM0_range_hit
18. DIMM1_Select=DIMM1_intlv_hit&DIMM1_range_hit
19. DIMM2_Select=DIMM2_intlv_hit&DIMM2_range_hit
20. DIMM3_Select=DIMM3_intlv_hit&DIMM3_range_hit
21. DIMM4_Select=DIMM4_intlv_hit&DIMM4_range_hit
22. DIMM5_Select=DIMM5_intlv_hit&DIMM5_range_hit
23. DIMM6_Select=DIMM6_intlv_hit&DIMM6_range_hit
24. DIMM7_Select=DIMM7_intlv_hit&DIMM7_range_hit 4. The Non-Existant Memory Check Function It is possible for a processor P to issue a request to an address that is not implemented. For example, a system that is populated with 8MB of memory implements byte addresses 0 through 7FFFFF, where the addresses are expressed in hexadecimal format. If a processor issues a request to address 800000, the system must detect that the request is a request to a data item that is not implemented and must return status, indicating as much, to the issuing processor.

In the illustrative embodiment, references to non-existant memory addresses are detected only in QSA 1000 and directory 540. Each memory module can only detect whether an address is implemented within its two arrays, i.e., it cannot detect if an address is implemented on another array on another module. Memory modules, therefore, cannot detect references to non-existant addresses.

QSA non-existant memory checking is performed by the same logic, i.e., port mapping logic 1950, as memory read data steering. In particular the logic state QSA_NXM, which indicates that a given memory reference addresses a non-existant memory location, is derived from the Array_Range_Hit logic terms derived in pseudo-code segment VIII. The QSA_NXM state is derived as shown in pseudocode segment X below.

Pseudocode Segment X

QSA_NXM=~array0_mg_hit&~array1_mg_hit &~array2_mg_hit&~array3_mg_hit&~array4_ mg_hit&~array5_mg_hit&~array6_mg_ hit&~array7_mg_hit The directory non-existant memory checking is done by the same logic, i.e., DIMM range check logic 1290, as the directory read data steering. In particular the logic state Dir_NXM, which indicates that a memory reference addresses a non-existant memory location, is derived from the DIMM_Select logic terms derived in pseudocode segment XI. The Dir_NXM state is derived as shown in pseudocode segment XI below.

Pseudocode Segment XI

Dir_NXM=~DIMM0_Select&~DIMM1_ Select&~DIMM2_Select&~DIMM3_ Select&~DIMM4_Select&~DIMM5_ Select&~DIMM6_Select&~DIMM7_Select While there has been shown and described illustrative embodiments of a phantom-resource memory address mapping system that reduces access latency in a memory using a fixed-resource mapping technique, it is to be understood that various other adaptations and modifications may be made within the spirit and scope of the invention. For example as described in an illustrative embodiment herein, the memory is organized as a traditional fully-interleaved system with a single address space but is configured with less than the total number of fixed resources; that is, instead of 32-banks of memory, the memory is configured with only sixteen (16) banks. A request having an address destined for bank 15 is mapped to banks 15 and 31. The first interleave translation logic stage 710 operates as if bank 31 exists, and the resource mapping and busy logic sets appropriate flags to indicate that the phantom bank 31 is busy. The bank busy logic then provides these flags as input to the arbiter. The memory resources are instructed via the output of the arbitration function 730 to respond to either bank 15 or 31. Since bank 31 does not exist, only bank 15 responds to the memory request. According to the invention, the novel mapping technique applies equally to 16-way interleave, 8-way interleave and 4-way interleave memory systems.

In the case of an alternate 4-way interleave system embodiment, there are only 4 physical banks in the memory and the inventive technique operates as though there are an additional 28 phantom banks. When a processor issues a request to the 4-way system, the address is translated by the first interleave translation logic using the 5-bit decode operation and the translated request is dispatched to all of the banks mapping to the address. For example, the addressed request may map to banks 0, 4, 8, 12, 16, 20, 24, 28 and 32; however, only one physical memory bank (bank 0) services each of these requests. Arbitration still occurs in a fair manner (e.g., bank 0 has the highest priority and bank 32 has the lowest priority) so that at least one of the requests issues.

If the request to bank 0 issues, the memory technique sets all of the other mapped banks busy. When the request to bank 0 completes, requests to all of the remaining banks arbitrate and one of the remaining requests (e.g., to bank 4) is granted access to the memory. Physical bank 0 then responds to this phantom bank request 4 and the remaining banks are set busy.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An address mapping system for reducing latency incurred when accessing data stored on memory resources of a data processing system in response to a memory reference request issued by a processor, the memory resources configured as one of a stacked-hybrid and a fully-interleaved hierarchy of memory resources, the address mapping system comprising:

memory access circuitry having a topology that comprises interleaved-based translation circuitry and stacked-based translation circuitry, the topology further comprising a primary memory access path that includes the interleave-based translation circuitry.

2. The address mapping system of claim 1 wherein the interleave-based translation circuitry comprises a first translation stage coupled to a plurality of second translation stages via an arbitration stage.

3. The address mapping system of claim 2 wherein the first translation stage translates the memory reference request to an arbitration request directed to at least one memory resource, and wherein the plurality of second translation stages perform array mapping operations to initiate preliminary access to the translated memory resource.

4. The address mapping system of claim 3 wherein the first translation stage comprises an n-bit interleave translation function.

5. The address mapping system of claim 4 wherein the first translation stage comprises a 5-bit interleave translation function.

6. The address mapping system of claim 3 wherein each second translation stage comprises masking and comparison circuits for performing respective masking and comparison functions.

7. The address mapping system of claim 6 wherein the masking and comparison functions are 2-bit functions.

8. The address mapping system of claim 6 wherein the comparison function compares a programmable interleave value with a programmable number of address bits.

9. The address mapping system of claim 8 wherein the comparison circuit is programmed to a common value.

10. The address mapping system of claim 3 wherein the stacked-based translation circuitry is configured to operate in parallel with the preliminary access to isolate an actual memory resource referenced by the memory address request.

11. A memory address mapping system for reducing latency incurred when accessing data stored on memory resources of a data processing system in response to a memory reference request issued by a processor, the address mapping system comprising:

memory access circuitry including a translation stage coupled to an arbitration stage, the translation stage mapping the memory reference request to an arbitration request directed to a fixed interleave configuration of logical interleave units.

12. The memory address mapping system of claim 11 wherein the memory resources comprise a stacked configuration, and wherein the memory access circuitry further comprises means for busying multiple logical interleave units.

13. The memory address mapping system of claim 12 wherein the means for busying comprises resource mapping logic that combines values of a misc_busy_mask field and a port_busy_mask field with a value of selected address bits of the memory reference request to determine which logical interleave units to set busy.

14. The memory address mapping system of claim 12 wherein the memory resources further comprise physical interleave units, and wherein a partially-populated data processing system comprises less physical interleave units than logical interleave units.

15. The memory address mapping system of claim 14 wherein the means for busying comprises means for busying multiple logical interleave units for each one physical interleave unit that is busied.

16. The memory address mapping system of claim 15 wherein the means for busying comprises resource mapping logic that combines values of a misc_busy_mask field and a port_busy_mask field with a value of selected address bits of the memory reference request.

17. The memory address mapping system of claim 11 wherein the memory resources comprise a stacked configuration, and wherein the memory access circuitry further comprises means for accessing multiple memory resources in parallel.

18. The memory address mapping system of claim 17 wherein the memory access circuitry further comprises means for selecting data from the accessed multiple memory resources.

19. The memory address mapping system of claim 18 wherein the memory access circuitry further comprises stacked address translation logic operating in parallel with the memory resource access, the stacked address translation logic isolating the actual memory resource referenced by the memory address request.

20. The memory address mapping system of claim 19 wherein the stacked address translation logic comprises a plurality of memory module translation circuits coupled to a central translation circuit.

21. The memory address mapping system of claim 20 wherein the memory resources comprise memory modules, each having at least one physical interleave unit, and wherein each memory module translation circuit comprises means for selecting data from a physical interleave unit within a memory module.

22. The memory address mapping system of claim 20 wherein the central translation circuit comprises means for selecting data from the memory modules of the system.

23. The memory address mapping system of claim 11 wherein a memory reference request issued to a non-existant location on a memory resource is mapped to an arbitration request in a manner similar to a request issued to an existing location on a memory resource.

24. The memory address mapping system of claim 23 wherein the memory access circuitry further comprises non-existant memory (NXM) detection logic configured to operate in parallel with a memory resource access.

* * * * *

UNITED STATES PATENT AND TRADEMARK OFFICE
CERTIFICATE OF CORRECTION

PATENT NO.  : 5,185,654

DATED       : February 9, 1993

INVENTOR(S) : Mark D. Mosher et al.

It is certified that error appears in the above-identified patent and that said Letters Patent is hereby corrected as shown below:

On title page, item [54] and col. 1, the title of invention should read:
--ELECTROSTATIC RF ABSORBANT CIRCUIT CARRIER ASSEMBLY--

Signed and Sealed this

Twenty-second Day of March, 1994

Attest:

BRUCE LEHMAN

Attesting Officer

Commissioner of Patents and Trademarks